US012719632B2

(12) United States Patent
Sakhnini

(10) Patent No.: US 12,719,632 B2
(45) Date of Patent: Aug. 25, 2026

(54) PHASE TRACKING REFERENCE SIGNAL DESIGN FOR GUARD INTERVAL BASED WAVEFORMS

(71) Applicant: QUALCOMM Incorporated, San Diego, CA (US)

(72) Inventor: Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/322,422

(22) Filed: May 23, 2023

(65) Prior Publication Data

US 2024/0396680 A1 Nov. 28, 2024

(51) Int. Cl.

| | |
|---|---|
| ***H04W 72/04*** | (2023.01) |
| ***H04L 5/00*** | (2006.01) |
| ***H04W 76/00*** | (2018.01) |
| ***H04W 88/08*** | (2009.01) |

(52) U.S. Cl.
CPC .................................. *H04L 5/0048* (2013.01)

(58) Field of Classification Search
None
See application file for complete search history.

(56) References Cited

U.S. PATENT DOCUMENTS

2018/0091350 A1* 3/2018 Akkarakaran ........ G01S 13/346
2019/0020522 A1* 1/2019 Sun ................... H04L 27/26134
2020/0067748 A1* 2/2020 Zhang ............... H04L 27/26025
2021/0360615 A1* 11/2021 Yang ..................... H04L 5/0007
2023/0308335 A1* 9/2023 Ferdinand ........... H04L 27/2636

FOREIGN PATENT DOCUMENTS

VN 10037416 B * 11/2023
WO WO-2024125765 A1 * 6/2024 ........... H04L 5/0005

* cited by examiner

*Primary Examiner* — Maharishi V Khirodhar
(74) *Attorney, Agent, or Firm* — Holland & Hart LLP

(57) ABSTRACT

Methods, systems, and devices for wireless communications are described. A user equipment (UE) may receive an indication of an intra-symbol phase tracking reference signal (PT-RS) pattern for a guard interval (GI)-based single carrier waveform, such as a discrete Fourier transform-spread-orthogonal frequency division multiplexed (DFT-s-OFDM) waveform. The UE may generate one or more PT-RSs according to the intra-symbol PT-RS pattern. The UE may arrange the one or more PT-RSs within a GI region of the GI-based single carrier waveform, within a data region of the GI-based single carrier waveform, or both, as indicated by the intra-symbol PT-RS pattern, and may transmit the one or more PT-RSs using the GI-based single carrier waveform. The PT-RS pattern may be based on a quantity of resource elements of the GI region, a quantity of resource blocks of the GI-based single carrier waveform, or both.

30 Claims, 17 Drawing Sheets

PHASE TRACKING REFERENCE SIGNAL DESIGN FOR GUARD INTERVAL BASED WAVEFORMS

FIELD OF TECHNOLOGY

The following relates to wireless communications, including phase tracking reference signal (PT-RS) design for guard interval (GI)-based waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-orthogonal frequency division multiplexing (DFT-s-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support phase tracking reference signal (PT-RS) design for guard interval (GI)-based waveforms. For example, the described techniques provide for wireless devices to utilize PT-RSs in GI-based single carrier waveforms, such as a discrete Fourier transform-spread-orthogonal frequency division multiplexed (DFT-s-OFDM) waveform. A user equipment (UE) may receive an indication of an intra-symbol PT-RS pattern for a GI-based single carrier waveform. The UE may generate one or more PT-RSs according to the intra-symbol PT-RS pattern. To transmit the GI-based single carrier waveform, the UE may arrange the one or more PT-RSs within a GI region of the GI-based single carrier waveform, within a data region of the GI-based single carrier waveform, or both, as indicated by the intra-symbol PT-RS pattern. In some examples, the UE may arrange the one or more PT-RSs into one or more groups of resource elements of the GI-based single carrier waveform. The PT-RS pattern may be based on a quantity of resource elements of the GI region, a quantity of resource blocks of the GI-based single carrier waveform, or both.

A method for wireless communications at a UE is described. The method may include receiving a message indicating an intra-symbol PT-RS pattern for a GI-based single carrier waveform, generating a set of multiple PT-RSs in accordance with the intra-symbol PT-RS pattern and a GI region of the GI-based single carrier waveform, and transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

An apparatus for wireless communications at a UE is described. The apparatus may include at least one processor, one or more memories coupled with the at least one processor, and instructions stored in the one or more memories. The instructions may be executable by the at least one processor to cause the apparatus to receive a message indicating an intra-symbol PT-RS pattern for a GI-based single carrier waveform, generate a set of multiple PT-RSs in accordance with the intra-symbol PT-RS pattern and a GI region of the GI-based single carrier waveform, and transmit, using the GI-based single carrier waveform, the set of multiple PT-RSs in one or both of a data region of the GI-based single carrier waveform or a GI region of the GI-based single carrier waveform in accordance with the intra-symbol PT-RS pattern.

Another apparatus for wireless communications at a UE is described. The apparatus may include means for receiving a message indicating an intra-symbol PT-RS pattern for a GI-based single carrier waveform, means for generating a set of multiple PT-RSs in accordance with the intra-symbol PT-RS pattern and a GI region of the GI-based single carrier waveform, and means for transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

A non-transitory computer-readable medium storing code for wireless communications at a UE is described. The code may include instructions executable by at least one processor to receive a message indicating an intra-symbol PT-RS pattern for a GI-based single carrier waveform, generate a set of multiple PT-RSs in accordance with the intra-symbol PT-RS pattern and a GI region of the GI-based single carrier waveform, and transmit, using the GI-based single carrier waveform, the set of multiple PT-RSs in one or both of a data region of the GI-based single carrier waveform or a GI region of the GI-based single carrier waveform in accordance with the intra-symbol PT-RS pattern.

In some examples of the method, apparatuses, and non-transitory computer-readable medium described herein, transmitting the set of multiple PT-RSs may include operations, features, means, or instructions for arranging the set of multiple PT-RSs into one or more groups of resource elements of the GI-based single carrier waveform in accordance with the intra-symbol PT-RS pattern.

In some examples of the method, apparatuses, and non-transitory computer-readable medium described herein, receiving the message may include operations, features, means, or instructions for receiving, via the message, an indication of a numerical quantity of the one or more groups of resource elements and a numerical quantity of resource elements per group of resource elements for the intra-symbol PT-RS pattern. In some examples of the method, apparatuses, and non-transitory computer-readable medium described herein, at least one of the one or more groups of resource elements span the GI region of the GI-based single carrier waveform in accordance with the intra-symbol PT-RS pattern.

In some examples of the method, apparatuses, and non-transitory computer-readable medium described herein, at least one of the one or more groups of resource elements spans a boundary between the data region of the GI-based single carrier waveform and the GI region of the GI-based single carrier waveform in accordance with the intra-symbol PT-RS pattern.

In some examples of the method, apparatuses, and non-transitory computer-readable medium described herein, the one or more groups of resource elements may be located within the GI region of the GI-based single carrier waveform in accordance with the intra-symbol PT-RS pattern.

In some examples of the method, apparatuses, and non-transitory computer-readable medium described herein, the one or more groups of resource elements may be located within the data region of the GI-based single carrier waveform in accordance with the intra-symbol PT-RS pattern.

In some examples of the method, apparatuses, and non-transitory computer-readable medium described herein, transmitting the set of multiple PT-RSs may include operations, features, means, or instructions for arranging the set of multiple PT-RSs into a first one or more groups of resource elements within the data region of the GI-based single carrier waveform and a second one or more groups of resource elements within the GI region of the GI-based single carrier waveform in accordance with the intra-symbol PT-RS pattern.

In some examples of the method, apparatuses, and non-transitory computer-readable medium described herein, the set of multiple PT-RSs may be transmitted via a first symbol of the GI-based single carrier waveform and the method, apparatuses, and non-transitory computer-readable medium may include further operations, features, means, or instructions for transmitting, via a second symbol of the GI-based single carrier waveform, a subset of PT-RSs of the set of multiple PT-RSs within a second GI region of the GI-based single carrier waveform.

In some examples of the method, apparatuses, and non-transitory computer-readable medium described herein, the intra-symbol PT-RS pattern may be based on a quantity of resource elements of the GI region of the GI-based single carrier waveform, a quantity of resource blocks of the GI-based single carrier waveform, or a combination thereof.

Some examples of the method, apparatuses, and non-transitory computer-readable medium described herein may further include operations, features, means, or instructions for performing a discrete Fourier transform (DFT) on the GI-based single carrier waveform that includes the set of multiple the PT-RSs in accordance with the intra-symbol PT-RS pattern.

Some examples of the method, apparatuses, and non-transitory computer-readable medium described herein may further include operations, features, means, or instructions for performing an inverse fast Fourier transform (IFFT) on the GI-based single carrier waveform, where the set of multiple PT-RSs may be included in the data region, the GI region, or both in accordance with the pattern.

In some examples of the method, apparatuses, and non-transitory computer-readable medium described herein, the GI region includes a zero-tail zero-head (ZT/ZH) GI subsequent to the data region of the GI-based single carrier waveform.

In some examples of the method, apparatuses, and non-transitory computer-readable medium described herein, the GI region may be subsequent in a time domain to the data region of the GI-based single carrier waveform.

A method for wireless communications at a network entity is described. The method may include transmitting a message indicating an intra-symbol PT-RS pattern for a GI-based single carrier waveform and receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

An apparatus for wireless communications at a network entity is described. The apparatus may include at least one processor, one or more memories coupled with the at least one processor, and instructions stored in the one or more memories. The instructions may be executable by the at least one processor to cause the apparatus to transmit a message indicating an intra-symbol PT-RS pattern for a GI-based single carrier waveform and receive, using the GI-based single carrier waveform, a set of multiple PT-RSs in one or both of a data region of the GI-based single carrier waveform or a GI region of the GI-based single carrier waveform in accordance with the intra-symbol PT-RS pattern.

Another apparatus for wireless communications at a network entity is described. The apparatus may include means for transmitting a message indicating an intra-symbol PT-RS pattern for a GI-based single carrier waveform and means for receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

A non-transitory computer-readable medium storing code for wireless communications at a network entity is described. The code may include instructions executable by at least one processor to transmit a message indicating an intra-symbol PT-RS pattern for a GI-based single carrier waveform and receive, using the GI-based single carrier waveform, a set of multiple PT-RSs in one or both of a data region of the GI-based single carrier waveform or a GI region of the GI-based single carrier waveform in accordance with the intra-symbol PT-RS pattern.

In some examples of the method, apparatuses, and non-transitory computer-readable medium described herein, receiving the set of multiple PT-RSs may include operations, features, means, or instructions for receiving the set of multiple PT-RSs via one or more groups of resource elements of the GI-based single carrier waveform in accordance with the intra-symbol PT-RS pattern.

Some examples of the method, apparatuses, and non-transitory computer-readable medium described herein may further include operations, features, means, or instructions for selecting the intra-symbol PT-RS pattern based on a quantity of resource elements of the GI region of the GI-based single carrier waveform, a quantity of resource blocks of the GI-based single carrier waveform, or a combination thereof.

In some examples of the method, apparatuses, and non-transitory computer-readable medium described herein, transmitting the message may include operations, features, means, or instructions for transmitting, via the message, an indication of a numerical quantity of the one or more groups of resource elements and a numerical quantity of resource elements per group of resource elements for the intra-symbol PT-RS pattern.

In some examples of the method, apparatuses, and non-transitory computer-readable medium described herein, at least one of the one or more groups of resource elements span the GI region of the GI-based single carrier waveform in accordance with the intra-symbol PT-RS pattern.

In some examples of the method, apparatuses, and non-transitory computer-readable medium described herein, at least one of the one or more groups of resource elements spans a boundary between the data region of the GI-based single carrier waveform and the GI region of the GI-based single carrier waveform in accordance with the intra-symbol PT-RS pattern.

In some examples of the method, apparatuses, and non-transitory computer-readable medium described herein, the one or more groups of resource elements may be located within the GI region of the GI-based single carrier waveform in accordance with the intra-symbol PT-RS pattern.

In some examples of the method, apparatuses, and non-transitory computer-readable medium described herein, the one or more groups of resource elements may be located within the data region of the GI-based single carrier waveform in accordance with the intra-symbol PT-RS pattern.

In some examples of the method, apparatuses, and non-transitory computer-readable medium described herein, receiving the set of multiple PT-RSs may include operations, features, means, or instructions for receiving the set of multiple PT-RSs via a first one or more groups of resource elements within the data region of the GI-based single carrier waveform and a second one or more groups of resource elements within the GI region of the GI-based single carrier waveform in accordance with the intra-symbol PT-RS pattern.

In some examples of the method, apparatuses, and non-transitory computer-readable medium described herein, the set of multiple PT-RSs may be received via a first symbol of the GI-based single carrier waveform and the method, apparatuses, and non-transitory computer-readable medium may include further operations, features, means, or instructions for receiving, via a second symbol of the GI-based single carrier waveform, a subset of PT-RSs of the set of multiple PT-RSs within a second GI region of the GI-based single carrier waveform.

In some examples of the method, apparatuses, and non-transitory computer-readable medium described herein, the GI region includes a ZT/ZH GI subsequent to the data region of the GI-based single carrier waveform.

In some examples of the method, apparatuses, and non-transitory computer-readable medium described herein, the GI region may be subsequent in a time domain to the data region of the GI-based single carrier waveform.

DETAILED DESCRIPTION

Figure 1:
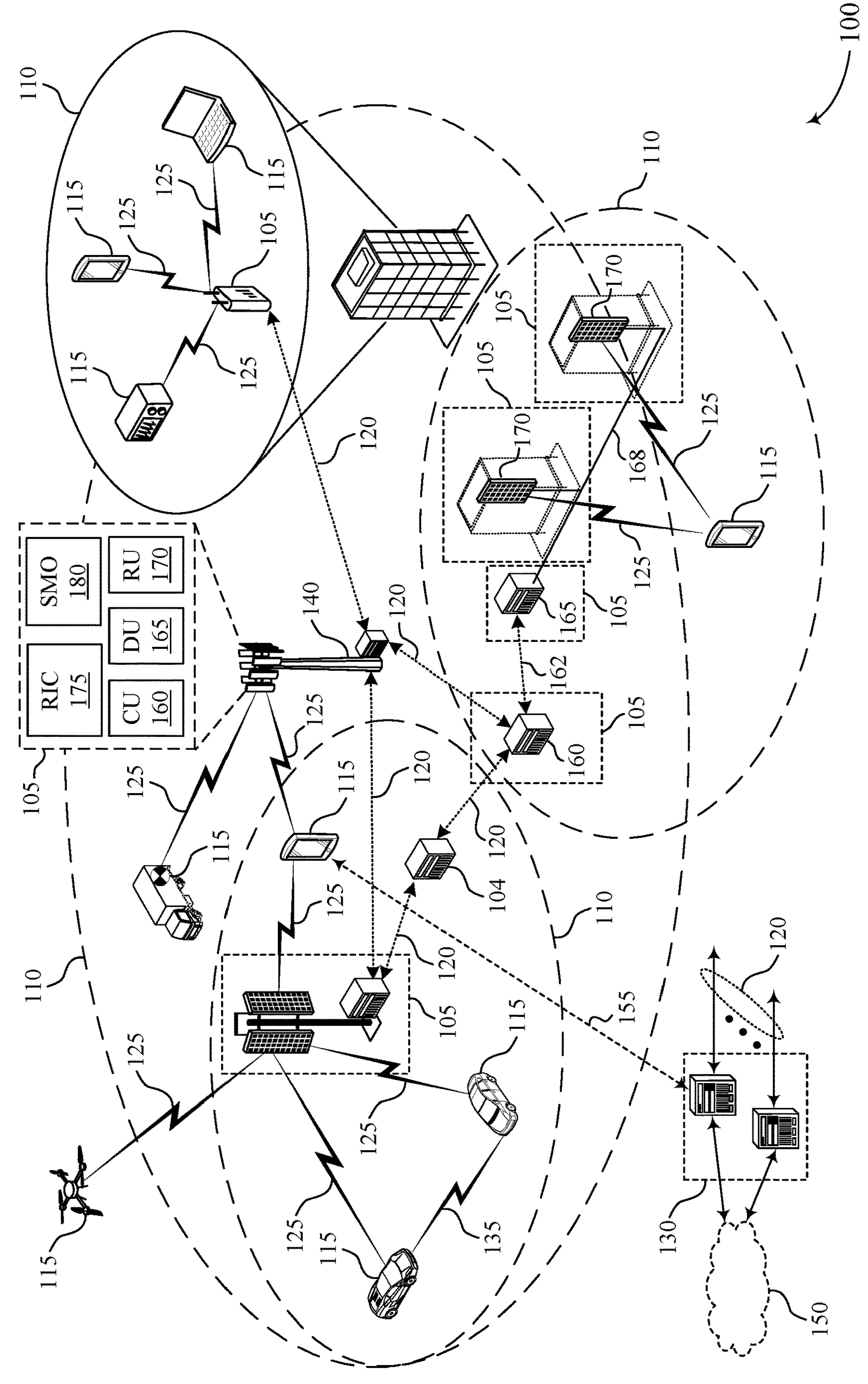
FIGS. 1 and 2 shows examples of wireless communications systems that support phase tracking reference signal (PT-RS) design for guard interval (GI)-based waveforms in accordance with one or more aspects of the present disclosure.

Wireless communications systems may support communications between a user equipment (UE) and a network entity via an uplink communications link (e.g., for transmissions from the UE) and a downlink communications link (e.g., for transmissions from the network entity). In some implementations, such wireless communications networks may support communications in high frequency bands to increase throughput and available bandwidth for both uplink and downlink signaling between devices. Further, a wireless communications network may implement discrete Fourier transform-spread-orthogonal frequency division multiplexed (DFT-s-OFDM) waveforms to accommodate such high frequency communications. A DFT-s-OFDM waveform, in some examples, may include a guard interval (GI) and a header sequence or a tail sequence (or a combination of these), which may support time-frequency tracking, channel estimation, and interference mitigation. For example, a GI may add a gap between symbols to reduce interference and align symbols in a frame, and may support efficient signal multiplexing.

In some cases, communications in relatively high frequency bands may be associated with increased phase noise compared to lower frequency bands. To support mitigating or reducing phase noise errors, wireless devices may use PT-RSs (PT-RSs). For example, a transmitting device may transmit one or more PT-RSs to a receiving device according to a pattern in a time domain. The pattern may indicate locations for transmitting the PT-RSs. The receiving device may receive and process the one or more PT-RSs to track and correct for phase noise associated with messages from the transmitting device, thereby improving reliability and accuracy of communications between the receiving and transmitting devices. Conventional PT-RS implementations may not be designed for use in GI-based single carrier waveforms, such as DFT-s-OFDM waveforms. For example, GI-based single carrier waveforms may not have locations defined for PT-RSs.

The techniques described herein support the use of PT-RSs in wireless communications that implement GI-based single carrier waveforms, such as DFT-s-OFDM waveforms. For example, a transmitting device, such as a user equipment (UE), may repurpose or otherwise utilize a GI region of the GI-based single carrier waveform to transmit one or more PT-RSs. The UE may receive an indication of an intra-symbol PT-RS pattern for a GI-based single carrier waveform. The intra-symbol PT-RS pattern may indicate locations within the GI-based single carrier waveform for the UE to transmit PT-RS(s). In some cases, the intra-symbol PT-RS pattern may indicate that PT-RSs are to be transmitted within a data region of the GI-based single carrier waveform, within a GI region of the GI-based single carrier waveform, or a combination thereof. In some examples, the UE may receive the indication of the intra-symbol PT-RS pattern from a network entity.

To transmit the GI-based single carrier waveform, the UE may generate one or more PT-RSs and arrange them within the GI-based single carrier waveform in accordance with the intra-symbol PT-RS pattern. In some examples, the UE may arrange the one or more PT-RSs into one or more groups of resource elements of the GI-based single carrier waveform, for example, based on a quantity of resource elements of the GI region, a quantity of resource blocks of the GI-based single carrier waveform, or a combination thereof. For instance, based on the intra-symbol PT-RS pattern, the UE may distribute a first group of resource elements within the data region of the GI-based single carrier waveform and may distribute a second group of resource elements within a GI region of the GI-based single carrier waveform. The UE may transmit the one or more PT-RSs via the first and second groups of resource elements using the GI-based single carrier waveform.

Particular aspects of the subject matter described in this disclosure may be implemented to realize one or more of the following potential improvements, among others. The techniques discussed herein may provide benefits and enhancements to the operation of the UE. For example, by enabling a UE to transmit PT-RS within a GI-based single carrier waveform, phase noise compensation in higher frequency bands may be enhanced, which may improve communications reliability for the UE and the network entity. Additionally, the UE may determine locations for transmitting PT-RSs based on the intra-symbol PT-RS pattern, which may increase accuracy in phase tracking and phase noise estimation. Further, utilizing the GI portion of a GI-based single carrier waveform to transmit PT-RSs may improve resource utilization efficiency, reduce overhead, and improve throughput, among other benefits.

Aspects of the disclosure are initially described in the context of wireless communications systems. Aspects of the disclosure are then discussed with reference to resource grids. Aspects of the disclosure are further illustrated by and described with reference to apparatus diagrams, system diagrams, and flowcharts that relate to PT-RS design for GI-based waveforms.

FIG. 1 shows an example of a wireless communications system 100 that supports PT-RS design for GI-based waveforms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support phase tracking reference signal design for guard interval based waveforms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 and a network entity 105 may communicate over a relatively high operating frequency band, such as frequency range two (FR2) bands or new-radio (NR) operating bands, using waveforms that support uplink communications, downlink communications, or both. In some cases, UE 115 and a network entity 105 may use multiple different types of waveforms, which may include GI-based OFDM waveforms, cyclic prefix (CP)-OFDM waveforms, single carrier frequency domain waveforms (e.g., DFT-s-OFDM), single carrier time domain waveforms (e.g., single carrier quadrature amplitude modulation (SC-QAM)), or any combinations thereof. Such waveforms may support communications in the relatively high operating frequency bands by having relatively low peak-to-average power ratios (PAPRs), and by at least partially mitigating the effects of high phase noise and increased UE complexity.

DFT-s-OFDM waveforms may be CP-based or GI-based. CP-based waveforms, such as CP-based DFT-s-OFDM waveforms or CP-OFDM waveforms, may have relatively high complexity, but may support relatively simple equalizers (e.g., single tap frequency domain equalization (FDE)), efficient FDM, increased subcarrier spacing, and efficient bandwidth utilization. However, CP-based waveforms may be associated with relatively high overhead, and may not be optimal for scenarios or environments with varying communication conditions. For example, a CP length of a CP-based waveform may be configured based on an associated delay spread environment. Thus, if the delay spread of the environment changes, the configured CP length may no longer provide sufficient performance. That is, the CP-based waveform may not support delay spread adaptation without changing an associated fast Fourier transform (FFT) size, which may further increase complexity.

In some cases, using a DFT-s-OFDM waveform may support interference mitigation (e.g., intra-symbol interference (ISI) frequency equalization, inter-channel interference (ICI) time domain phase noise estimation)) at wireless devices, and may support reduced power consumption in power intensive systems (e.g., high frequency bands, high data rates, or both). For example, DFT-s-OFDM waveforms may be used to transmit PT-RSs as part of integrated phase noise (IPN) mitigation, which may increase communications reliability and throughput. DFT-s-OFDM waveforms may support one or more transmission layers, and may also support uplink or downlink signaling via multiple transmission layers.

To generate a DFT-s-OFDM, a wireless device (e.g., a network entity 105, a UE 115) may input a set of M time domain data symbols (e.g., OFDM symbols) to a DFT operation of length M, which may generate and output a set of M DFT symbols. The wireless device may map the M DFT symbols output from the DFT operation to a set of N resource elements (e.g., subcarriers). The wireless device may perform an inverse FFT (IFFT) of length N to transform the information mapped to the N resource elements into N corresponding discrete time domain representations (e.g., digital signals carrying information in the time domain) for transmission.

Additionally, a DFT-s-OFDM waveform may include a header sequence and a tail sequence, which may be added to the beginning or end of a sequence (e.g., a set of M time domain data symbols) used to generate the waveform. For example, a zero head (ZH) and a zero tail (ZT) may refer to strings of zero bits (e.g., bits set to values of zero) added to the beginning and end of the sequence, respectively, before performing the DFT. Additionally, or alternatively, a unique word (e.g., a known sequence) header and a unique word tail may be appended to the beginning and end of the sequence, respectively, prior to DFT.

If the DFT-s-OFDM waveform is GI-based, each time domain symbol output from the IFFT may be associated with a GI. A GI may include a ZT or a known sequence, such as a unique word tail. When the GI includes or is an example of a ZT (and, in some cases, a ZH), the GI may provide a gap between symbols to reduce interference and align symbols in a frame. For example, a gap of zero bits between symbols may reduce ISI. When the GI includes or is an example of a known sequence, such as a unique word, the GI (e.g., the known sequence) may be utilized for synchronization, channel estimation, phase tracking, or other applications, which may reduce overhead as compared with CP-based symbol formats. In some cases, the GI may vary symbol-to-symbol in a slot, and a corresponding symbol duration and FFT size may remain constant. GI-based DFT-s-OFDM waveforms may thereby dynamically adapt to delay spreads, which may provide for improved communication reliability and reduced latency.

According to one or more aspects of the present disclosure, the wireless communications system 100 may support PT-RS transmission in GI-based single carrier waveforms, such as DFT-s-OFDM waveforms. A UE 115 may receive, from a network entity 105, a message (e.g., a control message) including an indication of an intra-symbol PT-RS pattern for a GI-based single carrier waveform. The UE 115 may determine, based on the intra-symbol PT-RS pattern, one or more locations for transmitting one or more PT-RSs using the GI-based single carrier waveform. The UE may generate one or more PT-RSs and arrange them within the GI-based single carrier waveform in accordance with the intra-symbol PT-RS pattern. For example, the UE 115 may insert PT-RSs prior to performing DFT on the GI-based single carrier waveform or after performing IFFT on the GI-based single carrier waveform. The network entity 105 may monitor for and receive the one or more PT-RSs in accordance with the intra-symbol PT-RS pattern. The network entity 105 may process the received one or more PT-RSs for use in a channel estimation procedure associated with communications with the UE 115.

Figure 2:
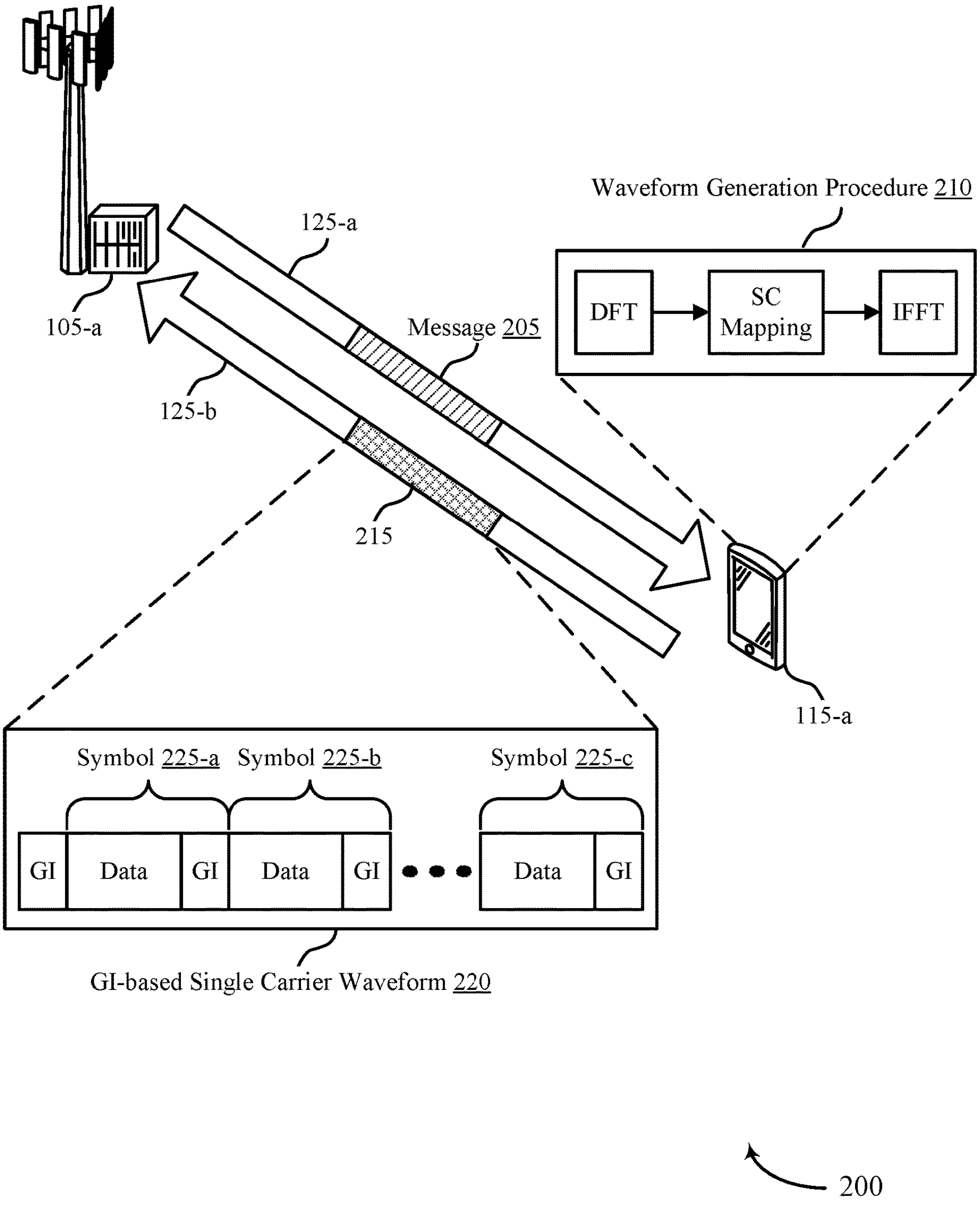

FIG. 2 shows an example of a wireless communications system 200 that supports PT-RS design for GI-based waveforms in accordance with one or more aspects of the present disclosure. The wireless communications system 200 may include a network entity 105-*a* and a UE 115-*a*, which may represent examples of a network entity 105 and a UE 115 as described with reference to FIG. 1. The network entity 105-*a* and the UE 115-*a* may communicate via communication links 125-*a* and 125-*b*, which may include or be examples of a downlink communication link (e.g., physical downlink shared channel (PDSCH), physical downlink control channel (PDCCH), or the like) and an uplink communication link (e.g., physical uplink shared channel (PUSCH), physical uplink control channel (PUCCH), or the like), respectively. The network entity 105-*a* and UE 115-*a* may be examples of transmitting and receiving devices described herein.

The wireless communications system 200 may implement GI-based single carrier waveforms, such as a GI-based single carrier waveform 220. In some examples, the GI-based single carrier waveform 220 may be an example of a DFT-s-OFDM waveform. Additionally, the network entity 105-*a* and the UE 115-*a* may utilize GI-based single carrier waveforms to transmit PT-RSs for estimation and correction of phase noise error. In some cases, the network entity 105-*a* may enable or disable PT-RS transform precoding for the UE 115-*a* based on a waveform type configured for PUSCH communications from the UE 115-*a*. For example, when transform precoding is enabled for PT-RSs, the UE 115-*a* may be configured to use DFT-s-OFDM waveforms.

The network entity 105-*a* may schedule transmissions to and from the UE 115-*a*, e.g., via the communication links 125-*a* and 125-*b*, respectively. For example, the network entity 105-*a* may transmit, to the UE 115-*a*, downlink control information (DCI) indicating resources of the communication link 125-*b* allocated for an uplink message 215 from the UE 115-*a*. The UE 115-*a* may use a GI-based single carrier waveform 220 to transmit the uplink message 215, which may include data (e.g., PUSCH), to the network entity 105-*a* via the allocated resources of the communication link 125-*b*. The UE 115-*a* may additionally transmit one or more PT-RSs within the uplink message 215 (e.g., together with the data) so that the network entity 105-*a* may accurately estimate phase noise error associated with the UE 115-*a*. The network entity 105-*a* may utilize the estimated phase noise error to perform channel estimation of the communication link 125-*b* and, in some cases, improve communications performance.

In accordance with the present disclosure, the network entity 105-*a* may configure the UE 115-*a* with a PT-RS pattern according to which the UE 115-*a* is to transmit PT-RSs. The network entity 105-*a* may transmit, via the communication link 125-*a*, a message 205 indicating an intra-symbol PT-RS pattern for a GI-based single carrier waveform 220. The message 205 may include or be an example of a control message (e.g., DCI, radio resource control (RRC) signaling, media access control control element (MAC-CE), or the like). The intra-symbol PT-RS pattern may indicate locations (e.g., time resources, frequency resources) of the GI-based single carrier waveform 220 at which the UE 115-*a* is to transmit (e.g., via the communication link 125-*b*) PT-RSs to the network entity 105-*a*. When the UE 115-*a* transmits an uplink message 215 (e.g., PUSCH) to the network entity 105-*a* using the GI-based single carrier waveform 220, the UE 115-*a* may insert PT-RSs into the uplink message 215 in accordance with the intra-symbol PT-RS pattern. For example, based on receiving the message 205, the UE 115-*a* may perform a waveform generation procedure 210 to generate one or more PT-RSs. The UE 115-*a* may arrange the one or more PT-RSs into one or more groups of resource elements of the GI-based single carrier waveform 220 in accordance with the intra-symbol PT-RS pattern. The UE 115-*a* may transmit, to the network entity 105-*a* via the communication link 125-*b*, an uplink message 215 including uplink data and the one or more PT-RSs using the GI-based single carrier waveform 220.

The GI-based single carrier waveform 220 may have a GI-based structure in which symbols 225 each include a respective data portion and a GI portion. The GI region may be subsequent in a time domain to the data region of a symbol 225. As illustrated in FIG. 2, the GI-based single carrier waveform 220 includes a symbol 225-*a*, a symbol 225-*b*, and a symbol 225-*c*, though it is to be understood that any quantity of symbols 225 may be supported by the techniques described herein. Each symbol 225 of the GI-based single carrier waveform 220 may include data within a data region and a GI within a GI region, as well as header sequences, tail sequences, or both. Moreover, as described herein, one or both of the data region and the GI region of a symbol 225 may include one or more PT-RSs, e.g., in accordance with the intra-symbol PT-RS pattern configured and indicated by the network entity 105-*a*.

To generate the GI-based single carrier waveform 220 for transmission of the uplink message 215, the UE 115-*a* may perform the waveform generation procedure 210. The UE 115-*a* may append a header sequence, a tail sequence, or both, to a sequence of one or more modulated data symbols (e.g., OFDM symbols). The UE 115-*a* may perform a DFT operation of length M on an input sequence that includes the sequence of modulated data symbols, the header sequence, and the tail sequence. The DFT operation may output a set of M DFT symbols. The UE 115-*a* may map the M DFT symbols output from the DFT operation to a set of N resource elements (e.g., subcarriers). The UE 115-*a* may perform an IFFT of length N to transform the information mapped to the N resource elements into N corresponding discrete time domain representations (e.g., symbols 225) of the GI-based single carrier waveform 220. The UE 115-*a* may transmit the uplink message 215 including the N corresponding discrete time domain representations via the communication link 125-*b* using the GI-based single carrier waveform 220.

A GI for a GI-based single carrier waveform 220 may be implemented by the UE 115-*a* during the waveform generation procedure 210. The type of GI and the waveform generation procedure 210 may depend on the intra-symbol PT-RS pattern. For example, the UE 115-*a* may implement a ZT GI, where the UE 115-*a* appends a sequence of zero bits (e.g., a zero vector) at the end of each modulated data symbol prior to performing the DFT operation. Here, after the waveform generation procedure 210, the GI region of each symbol 225 may include the sequence of zero bits (e.g., the ZT), which may create a gap between each of the symbols 225 and may reduce ISI among the symbols 225. To create a ZT/ZH GI, the UE 115-*a* may insert a header sequence of zero bits (e.g., a ZH) and a tail sequence of zero bits (e.g., a ZT) at the beginning and end, respectively, of each modulated data symbol before performing the DFT operation. In this example, after the waveform generation procedure 210, an initial portion of each data region of respective symbols 225 may include the ZH and the GI region may include the ZT, which may provide additional gaps between the symbols 225.

Additionally, or alternatively, the GI may include or be an example of a unique word GI, such that the GI region of each symbol 225 includes a known sequence. In such examples, the UE 115-*a* may append some known signal or sequence to the end (and possibly the beginning) of the one or more modulated data symbols before performing the DFT operation. That is, the header sequence and the tail sequence appended to the one or more modulated data symbols may be examples of fixed sequences (i.e., "unique words"), which may enhance cyclic properties of the GI-based single carrier waveform 220. The initial portion of each data region of respective symbols 225 may include the header sequence and each GI region of respective symbols 225 may include the tail sequence.

In some examples, the UE 115-*a* may implement both a unique word and a ZT/ZH to generate the GI-based single carrier waveform 220. In such examples, the UE 115-*a* may append a ZH and a ZT to the one or more modulated data symbols and may perform the waveform generation procedure 210. After performing the waveform generation procedure 210, the UE 115-*a* may append a unique word header sequence, a unique word tail sequence, or both, to each symbol 225. Thus, each symbol 225 may include a ZH, a unique word header sequence, a unique word tail sequence, and a ZT.

According to the techniques described herein, the UE 115-*a* may generate and insert one or more PT-RSs during the waveform generation procedure 210 such that the GI-based single carrier waveform 220 obtained by the waveform generation procedure 210 includes the one or more PT-RSs at the locations indicated by the intra-symbol PT-RS pattern. That is, the UE 115-*a* may generate the GI-based single carrier waveform 220 such that each symbol 225 includes one or more PT-RSs in accordance with the intra-symbol PT-RS pattern. In some cases, the UE 115-*a* may include the one or more PT-RSs in a respective data region of each symbol 225, in a respective GI region of each symbol 225, or a combination thereof, according to the intra-symbol PT-RS pattern. Additionally, or alternatively, the UE 115-*a* may include the one or more PT-RSs in a subset of data regions of the symbols 225 and in every GI region of the symbols 225. For example, the UE 115-*a* may be configured (e.g., by the network entity 105-*a*) to transmit PT-RS(s) in a data region of every other symbol 225, but may transmit PT-RS(s) in each GI region of each symbol 225.

The UE 115-*a* may input one or more PT-RSs together with the one or more modulated data symbols in a transform precoding stage of the waveform generation procedure 210, e.g., prior to performing the DFT operation. In a first example, the one or more PT-RSs may be considered unique word sequences, where, based on the intra-symbol PT-RS pattern, the UE 115-*a* appends a PT-RS sequence to the end (and, in some cases, the beginning) of each modulated data symbol. During the waveform generation procedure 210, the UE 115-*a* may perform the DFT operation on the one or more modulated data symbols and PT-RS sequence(s) (e.g., may perform the DFT operation on the GI-based single carrier waveform 220). Thus, each symbol 225 may include a PT-RS within a respective GI region in accordance with the intra-symbol PT-RS pattern.

In a second example, before performing the DFT operation, the UE 115-*a* may additionally or alternatively insert one or more PT-RSs (e.g., one or more PT-RS sequences) among the one or more modulated data symbols according to the intra-symbol PT-RS pattern. Here, the UE 115-*a* may perform the DFT operation on the one or more modulated data symbols and PT-RS sequence(s) such that, after the waveform generation procedure 210, each symbol 225 includes the one or more PT-RSs in a respective data region. In some cases, the UE 115-*a* may combine the first and second examples and may insert one or more PT-RS sequences within a sequence of one or more modulated data symbols and may additionally append one or more PT-RS sequences to the beginning, the end, or both of the sequence of one or more modulated data symbols. In such cases, each symbol 225 may include one or more PT-RSs in a respective data region, a respective GI region, or both.

In some cases, the UE 115-*a* may additionally, or alternatively, include one or more PT-RSs in respective data regions, respective GI regions, or both, of the symbols 225, e.g., after performing the waveform generation procedure 210. More specifically, the UE 115-*a* may perform the DFT operation, the subcarrier mapping, and the IFFT operation on one or more modulated data symbols (e.g., on the GI-based single carrier waveform 220) prior to inserting one or more PT-RSs in each symbol 225 according to the intra-symbol PT-RS pattern.

As described in more detail with reference to FIGS. 3A-3E, the intra-symbol PT-RS pattern may indicate resources (e.g., time resources, frequency resources) via which the UE 115-*a* is to transmit PT-RSs using the GI-based single carrier waveform 220. For example, the intra-symbol PT-RS pattern may indicate indexes of resource elements within a data region of a symbol 225, indexes of resource elements within a GI region of a symbol 225, or some combination thereof. Resource element indexes indicated by the intra-symbol PT-RS pattern may refer to locations (e.g., symbol locations) of PT-RSs prior to transform precoding. In some cases, the intra-symbol PT-RS pattern may indicate one or more groups of resource elements of the GI-based single carrier waveform 220, where each group of resource elements includes a quantity of resource elements.

The resources used for PT-RSs, and thus the intra-symbol PT-RS pattern, may be based on a corresponding uplink resource allocation for the UE 115-*a*. That is, for a scheduled uplink message (e.g., PUSCH), such as the uplink message 215, the UE 115-*a* may be configured to transmit one or more PT-RSs via a set of time resources and frequency resources of the uplink message 215 based on a quantity of time resources allocated for the uplink message 215, a quantity of frequency resources allocated for the uplink message 215, or a combination thereof. A PT-RS time domain density may depend on a modulation and coding scheme (MCS) of the uplink message 215, while a PT-RS frequency domain density may depend on a bandwidth scheduled for the uplink message 215. In some cases, PT-RS resources may further depend on demodulation reference signal (DMRS) symbol locations in the uplink message 215, a DMRS configuration type, a physical resource block (PRB) allocation of the uplink message 215, or a combination thereof.

For a GI-based single carrier waveform 220, the UE 115-*a* may insert one or more PT-RSs as one or more groups of PT-RS samples (e.g., PT-RS symbols). For example, multiple PT-RS occasions may be configured per symbol 225, where each symbol 225 includes a quantity of groups of PT-RS samples (e.g., a quantity of groups of resource elements) denoted by $$N_{group}^{PT-RS},$$

and each group includes a quantity of PT-RS samples (e.g., a quantity of resource elements per group of resource elements) denoted by $$N_{samp}^{group}.$$

A PT-RS density in a symbol 225 (e.g., a PT-RS time domain density) may be defined as $$\left[N_{samp}^{group}, N_{group}^{PT-RS}\right].$$

As an example, when the uplink message 215 is associated with a PT-RS sample density of [2,2], the uplink message 215 may include two PT-RS groups, each PT-RS group including two PT-RS samples.

The PT-RS density may be a function of a quantity of resource blocks (e.g., a frequency resource allocation) scheduled for the uplink message 215. In some cases, the network entity 105-*a*, the UE 115-*a*, or both, may determine or otherwise select a PT-RS density based on one or more threshold values of the quantity of resource blocks, as illustrated by Table 1 below. In Table 1, NRB denotes the quantity of resource blocks scheduled for the uplink message 215. A first NRB threshold value is represented by NRB0, a second NRB threshold value is represented by NRB1, and so on, through a fifth NRB threshold value represented by NRB4. Thus, a threshold index may indicate one or two NRB threshold values, e.g., as upper or lower limits on NRB.

TABLE 1

| Threshold Index | Scheduled number of resource blocks (NRB) | Number of PT-RS groups $\left(N_{group}^{PT-RS}\right)$ | Number of samples per PT-RS group $\left(N_{samp}^{group}\right)$ |
|---|---|---|---|
| 0 | NRB < NRB0 | No PT-RS | No PT-RS |
| 1 | NRB0 ≤ NRB < NRB1 | 2 | 2 |
| 2 | NRB1 ≤ NRB < NRB2 | 2 | 4 |
| 3 | NRB2 ≤ NRB < NRB3 | 4 | 2 |
| 4 | NRB3 ≤ NRB < NRB4 | 4 | 4 |
| 5 | NRB4 ≤ NRB | 8 | 4 |

For example, if the uplink message 215 is scheduled with a quantity of resource blocks NRB that is less than the first NRB threshold value NRB0, the UE 115-*a* may not transmit PT-RS in the uplink message 215. In another example, the network entity 105-*a* may schedule the uplink message 215 with a quantity of resource blocks NRB that is greater than the second NRB threshold value NRB1 but less than a third NRB threshold value NRB2. Accordingly, the network entity 105-*a* may select an intra-symbol PT-RS pattern that corresponds to a threshold index of 2. The network entity 105-*a* may indicate the selected intra-symbol PT-RS pattern to the UE 115-*a*. In accordance with the intra-symbol PT-RS pattern, the UE 115-*a* may transmit, in the uplink message 215, two PT-RS groups, each PT-RS group including four PT-RS samples. The UE 115-*a* may transmit the PT-RS groups and PT-RS samples via resource elements indicated by the intra-symbol PT-RS pattern.

In some cases, the network entity 105-*a* may indicate, to the UE 115-*a*, $$N_{samp}^{group}, N_{group}^{PT-RS},$$

the NRB threshold values, one or more threshold indexes, or some combination thereof, e.g., in addition to or as part of the intra-symbol PT-RS pattern. For example, the network entity 105-*a* may indicate (e.g., via control signaling) the intra-symbol PT-RS pattern and all or a subset of Table 1 to the UE 115-*a*. When the network entity 105-*a* schedules the UE 115-*a* with the uplink message 215, the UE 115-*a* may determine $$N_{samp}^{group} \text{ and } N_{group}^{PT-RS}$$

using the NRB threshold values of Table 1 and based on a quantity of resource blocks NRB scheduled for the uplink message 215. The UE 115-*a* may determine locations (e.g., resource elements) for the PT-RS groups and PT-RS samples within the GI-based single carrier waveform 220 based on the intra-symbol PT-RS pattern.

In some examples, the intra-symbol PT-RS pattern for a GI-based single carrier waveform 220 may be based on NRB, $$N_{samp}^{group}, N_{group}^{PT-RS},$$

one or more NRB threshold values, one or more threshold indexes, or some combination thereof, as illustrated in Table 2 below.

TABLE 2

| Threshold Index | Scheduled number of resource blocks (NRB) | Number of PT-RS groups $\left(N_{group}^{PT-RS}\right)$ | Number of samples per PT-RS group $\left(N_{samp}^{group}\right)$ | Intra-symbol PT-RS pattern index |
|---|---|---|---|---|
| 0 | NRB < NRB0 | No PT-RS | No PT-RS | 0 |
| 1 | NRB0 ≤ NRB < NRB1 | 2 | 2 | 1 |
| 2 | NRB1 ≤ NRB< NRB2 | 2 | 4 | 2 |
| 3 | NRB2 ≤ NRB < NRB3 | 4 | 2 | 3 |
| 4 | NRB3 ≤ NRB < NRB4 | 4 | 4 | 4 |
| 5 | NRB4 ≤ NRB | 8 | 4 | 5 |

The network entity 105-*a* may indicate some or all of Table 2 to the UE 115-*a*. For example, the network entity 105-*a* may configure (e.g., via control signaling) the UE 115-*a* with multiple intra-symbol PT-RS patterns, where each intra-symbol PT-RS pattern is associated with an index. The UE 115-*a* may determine or otherwise select an intra-symbol PT-RS pattern for transmitting PT-RSs in the uplink message 215 based on the quantity of resource blocks NRB scheduled for the uplink message 215.

In other examples, the intra-symbol PT-RS pattern for a GI-based single carrier waveform 220 may be based on a GI length (e.g., a quantity of resource elements of a GI region) of the GI-based single carrier waveform 220. For example, the network entity 105-*a* may indicate an intra-symbol PT-RS pattern to the UE 115-*a* for the uplink message 215 based on a quantity of resource elements of each symbol 225 allocated for a respective GI. In some cases, a table, such as Table 3 below, may define a group NPT-RS correspondence between GI length, $N_{samp}^{group}$, $N_{group}^{PT-RS}$, and the intra-symbol PT-RS pattern. For example, the network entity 105-*a* may indicate some or all of Table 3 to the UE 115-*a*, and the UE 115-*a* may implement an intra-symbol PT-RS pattern based on a GI length associated with the GI-based single carrier waveform 220 used for the uplink message 215 in accordance with Table 3.

TABLE 3

| GRB threshold index | Resource blocks per GI | Number of PT-RS groups ($N_{group}^{PT-RS}$) | Number of samples per PT-RS group ($N_{samp}^{group}$) | Intra-symbol PT-RS pattern index |
|---|---|---|---|---|
| 0 | GRB < GRB0 | No PT-RS | No PT-RS | 0 |
| 1 | GRB0 ≤ GRB < GRB1 | 2 | 2 | 1 |
| 2 | GRB1 ≤ GRB < GRB2 | 2 | 4 | 2 |
| 3 | GRB2 ≤ GRB < GRB3 | 4 | 2 | 3 |
| 4 | GRB3 ≤ GRB < GRB4 | 4 | 4 | 4 |
| 5 | GRB4 ≤ GRB | 8 | 4 | 5 |

FIGS. 3A-3E show examples of resource grids 301-305 that support PT-RS design for GI-based waveforms in accordance with one or more aspects of the present disclosure. The resource grids 301-305 may implement aspects of the wireless communications system 100 and the wireless communications system 200 described with reference to FIGS. 1 and 2, respectively. For example, the resource grids 301-305 may be based on a configuration by a network entity 105 and implemented by a UE 115. The resource grids 301-305 may be examples of resources (e.g., time resources, frequency resources) via which a UE transmits data and PT-RSs to a network entity. Broadly, the resource grids 301-305 illustrate PT-RS locations within GI-based single carrier waveforms, such as DFT-s-OFDM waveforms.

In the examples illustrated in FIGS. 3A-3E, the resource grids 301-305 include time resources (e.g., symbols, minislots, slots, subframes, or frames) as well as frequency resources (e.g., carriers or subcarriers). A combination of a time resource, such as a symbol, and a frequency resource, such as a subcarrier, may define an associated resource element. The resource grids 301-305 may represent a resource block allocation of six (6) resource blocks, where each resource block may include twelve (12) subcarriers. Thus, the examples of FIGS. 3A-3E illustrate resource elements defined by a subcarrier in the frequency domain and a symbol in the time domain, though not all resource elements may be shown. It is to be understood that other combinations of time resources and frequency resources may be implemented for the techniques described herein, and that the examples shown should not be construed as limiting.

As described with reference to FIG. 2, a network entity may schedule a UE with one or more PUSCHs. Each of the resource grids 301-305 may represent allocated resources via which the UE transmits data and PT-RSs for the scheduled one or more PUSCHs using a GI-based single carrier waveform. More specifically, each of the resource grids 301-305 may correspond to a respective intra-symbol PT-RS pattern as described herein. An intra-symbol PT-RS pattern may indicate or otherwise specify one or more resource elements, one or more groups of resource elements, or both, of a resource grid of the GI-based single carrier waveform.

In some cases, the intra-symbol PT-RS pattern may additionally or alternatively configure a quantity of PT-RS groups (e.g., $N_{group}^{PT-RS}$), a quantity of PT-RS samples per PT-RS group (e.g., $N_{samp}^{group}$), or a combination thereof. That is, the intra-symbol PT-RS pattern may indicate a quantity of PT-RS groups and a quantity of PT-RS samples per PT-RS group, and may indicate indexes of groups of resource elements to be used for each PT-RS group, indexes of resource elements to be used for each PT-RS sample in a respective PT-RS group, or some combination thereof.

In some cases, the UE may be configured with a set of intra-symbol PT-RS patterns and may select an intra-symbol PT-RS pattern on a per-PUSCH basis. That is, the UE may receive, from the network entity, a message indicating the set of intra-symbol PT-RS patterns. When the UE is scheduled with a PUSCH, the UE may determine or otherwise select a corresponding intra-symbol PT-RS pattern to use for the PUSCH, for example, based on a quantity of resource elements allocated for the PUSCH. In some examples, the UE may receive, from the network entity, an indication of Table 1. Table 2, or Table 3, as described with reference to FIG. 2, and may determine the intra-symbol PT-RS pattern for the scheduled PUSCH based on the indicated table. For instance, the UE may compare a quantity of resource blocks (e.g., NRB) scheduled for the PUSCH to one or more threshold NRB values. If the quantity of resource blocks scheduled for the PUSCH satisfies the one or more threshold NRB values, the UE may use a corresponding intra-symbol PT-RS pattern as indicated by the table.

In other cases, the UE may receive, from the network entity, a message indicating an intra-symbol PT-RS pattern for a scheduled PUSCH. For example, the message may indicate an intra-symbol PT-RS pattern index, a quantity of groups of resource elements of the GI-based single carrier waveform, a quantity of resource elements per group of resource elements, or a combination thereof, for the UE to use when transmitting the scheduled PT-RS. In any case, the UE may generate the GI-based single carrier waveform such that PT-RSs are included in resource elements designated by the intra-symbol PT-RS pattern.

In accordance with the intra-symbol PT-RS pattern, the UE may use the GI-based single carrier waveform to transmit one or more PT-RSs via the indicated resource element (s), and may transmit data via other resource elements. As such, each of the resource grids 301-305 may include a data region 310 and a GI region 315. A data region 310 may be defined as a set of resource elements of a GI-based single carrier waveform in which the UE transmits data, such as data symbols 320, and, in some cases, PT-RS samples, such as PT-RS symbols 330. A GI region 315 may be defined as a set of resource elements of the GI-based single carrier waveform in which the UE transmits a GI, such as a ZT/ZH GI, a unique word, one or more PT-RS symbols 330, or a combination thereof. A GI symbol 335 may refer to a resource element in the GI region 315 that carries a unique word sample, while a PT-RS and GI symbol 325 refers to a resource element in the GI region 315 that carries a PT-RS sample. An empty symbol 340 may be a resource element in the GI region 315 that carries no information or that carries a ZH/ZT GI sample (e.g., a zero bit).

In some examples, the intra-symbol PT-RS pattern may be such that all or part of a GI region 315 constitutes part of the intra-symbol PT-RS pattern. By utilizing some or all of a GI region 315 for PT-RS samples, the UE may improve communications efficiency and phase noise error estimation accuracy, for example, as compared to a GI region 315 that includes a ZT/ZH sequence. Additionally, in some cases, a length of a GI region 315 may be adjusted to adapt to changes in delay spread. For instance, the network entity increase or decrease a quantity of resource blocks allocated to the GI region 315 based on a corresponding delay spread, which may improve communications performance and reliability.

Figure 3A:
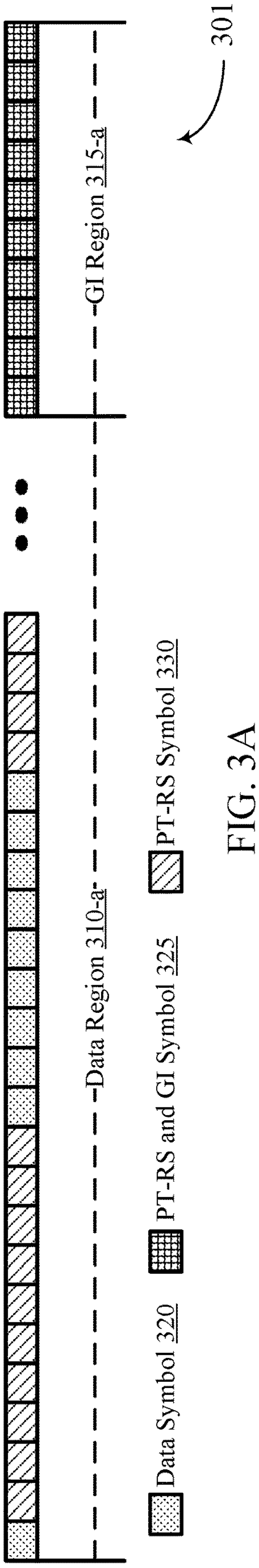
FIGS. 3A-3E show examples of resource grids that support PT-RS design for GI-based waveforms in accordance with one or more aspects of the present disclosure.

FIG. 3A shows an example resource grid 301 corresponding to an intra-symbol PT-RS pattern in which an entire GI region 315-*a* is designated for PT-RS samples. For example, the intra-symbol PT-RS pattern may indicate that a quantity of groups of PT-RSs is equal to four (4), and that each group of PT-RSs includes ten (10) PT-RS samples. The intra-symbol PT-RS pattern may further indicate that a first subset of the groups of PT-RSs (e.g., PT-RS symbols 330) are to be located within a data region 310-*a*, and a second subset of the groups of PT-RSs (e.g., the PT-RS and GI symbols 325) are to be located within the GI region 315-*a*. The GI region 315-*a* may have a length of 10 symbols such that the PT-RS and GI symbols 325 may span the full length of the GI region 315-*a*. To generate a GI-based single carrier waveform corresponding to the resource grid 301, the UE may insert PT-RS sequences among modulated data symbols as well as appending a PT-RS sequence to an end of a modulated data symbol. That is, the UE may arrange the first subset of the groups of PT-RSs within the data region 310-*a* and may arrange the second subset of the groups of PT-RSs within the GI region 315-*a* according to the intra-symbol PT-RS pattern.

Figure 3B:
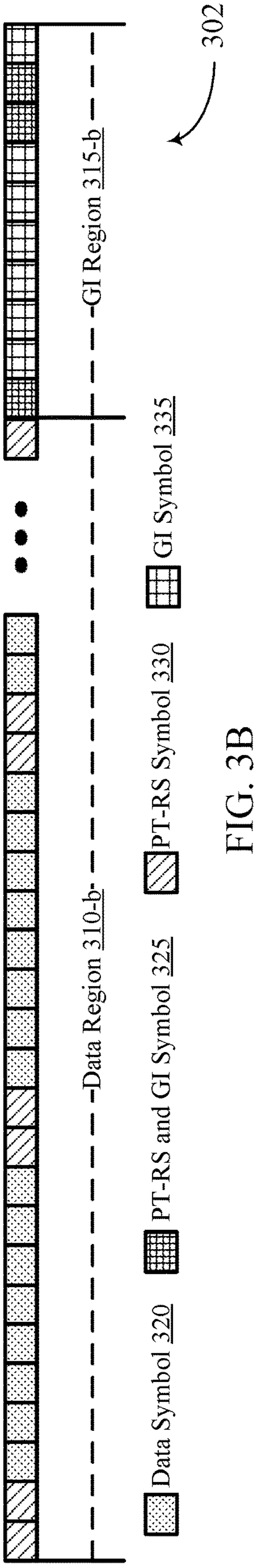

FIG. 3B shows an example resource grid 302 corresponding to an intra-symbol PT-RS pattern in which PT-RS samples are dispersed throughout a data region 310-*b* and a GI region 315-*b*. In the resource grid 302, the data region 310-*b* includes both data symbols 320 and PT-RS symbols 330, while the GI region 315-*b* includes both GI symbols 335 and PT-RS and GI symbols 325. The GI symbols 335 may carry samples of a unique word sequence, while the PT-RS and GI symbols 325 may carry PT-RS samples within the GI region 315-*b*. The intra-symbol PT-RS pattern may configure the PT-RS samples into multiple PT-RS groups of two PT-RS samples each, such that each PT-RS group occupies two resource elements (e.g., one resource element per PT-RS sample). The UE may arrange the PT-RS groups into groups of PT-RS symbols 330 within the data region 310-*b* and groups of PT-RS and GI symbols 325 within the GI region 315-*b*. Moreover, the intra-symbol PT-RS pattern may be designed such that one PT-RS group spans a boundary between the data region 310-*b* and the GI region 315-*b*, e.g., a first PT-RS sample of the PT-RS group is located within the data region 310-*b* and a second PT-RS sample of the PT-RS group is located within the GI region 315-*b*.

Figure 3C:
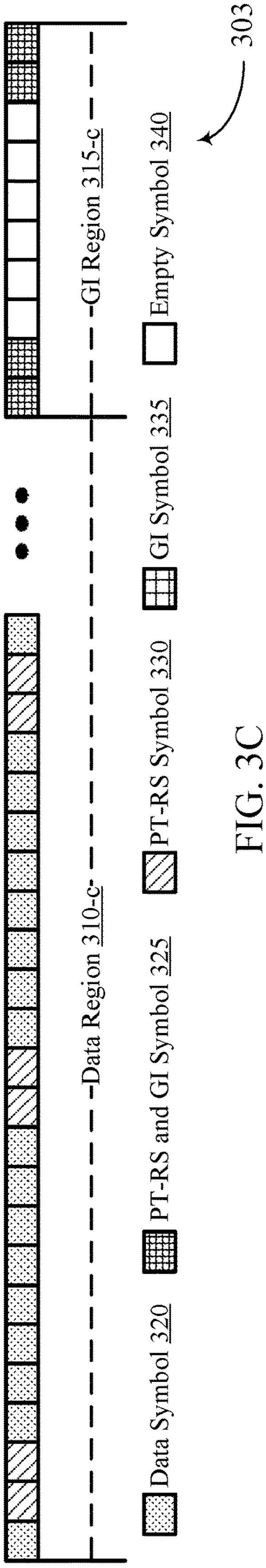
Figure 3D:
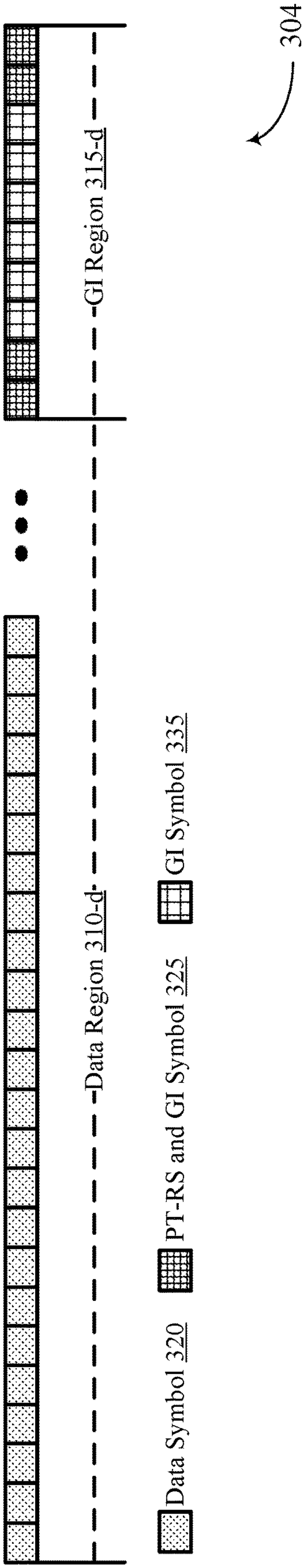

FIG. 3C shows an example resource grid 303 that corresponds to an intra-symbol PT-RS pattern in which PT-RS samples are distributed throughout a data region 310-*c* and a GI region 315-*c*. The data region 310-*c* may include PT-RS symbols 330 in accordance with the intra-symbol PT-RS pattern, as well as data symbols 320. The intra-symbol PT-RS pattern of the resource grid 303 may be configured for ZT GIs. That is, the UE may generate the GI-based single carrier waveform by appending a ZT sequence to modulated data symbols, such that the GI region 315-*c* of the resource grid 303 includes empty symbols 340. However, the intra-symbol PT-RS pattern may indicate that some empty symbols 340 may be overwritten by PT-RS samples, as illustrated by PT-RS and GI symbols 325 within the GI region 315-*c*. Thus, after generating the GI-based single carrier waveform (e.g., after performing DFT and IFFT operations on the ZT sequence and the modulated data symbols), the UE may insert PT-RS samples at PT-RS and GI symbols 325 of the GI region 315-*c* as indicated by the intra-symbol PT-RS pattern.

FIGS. 3A-3C illustrate examples of intra-symbol PT-RS patterns in which PT-RS samples are distributed across both a data region 310 and a GI region 315. In some cases, however, PT-RS samples may be restricted to only a data region 310 or only a GI region 315. For example, as illustrated by resource grid 304 of FIG. 3D, an intra-symbol PT-RS pattern may limit PT-RS samples to be located within a GI region 315-*d*. In this example, a data region 310-*d* of the resource grid 304 includes only data symbols 320, while the GI region 315-*d* includes PT-RS and GI symbols 325 (e.g., according to the intra-symbol PT-RS pattern), as well as GI symbols 335. By transmitting PT-RSs within the GI region 315-*d* (e.g., and not within the data region 310-*d*), the UE may improve throughput and reduce overhead associated with PT-RSs.

Figure 3E:
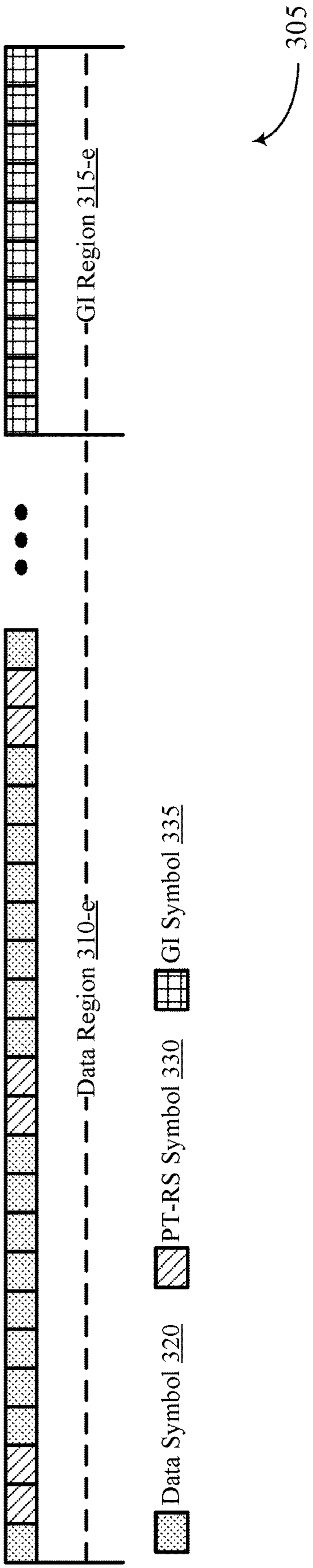

In contrast, FIG. 3E shows an example resource grid 305 corresponding to an intra-symbol PT-RS pattern in which PT-RS samples are restricted to transmission within a data region 310-*e*. Such an intra-symbol PT-RS pattern may be used, for example, when a GI region 315-*e* is configured for use in synchronization, channel estimation, time or frequency tracking, or the like. For instance, the GI region 315-*e* may include GI symbols 335 carrying a unique word that spans a length of the GI region 315-*e*, and inserting PT-RS samples in the GI region 315-*e* may disrupt the unique word. Thus, the intra-symbol PT-RS pattern may indicate PT-RS symbols 330 as being located only within the data region 310-*e*.

Figure 4:
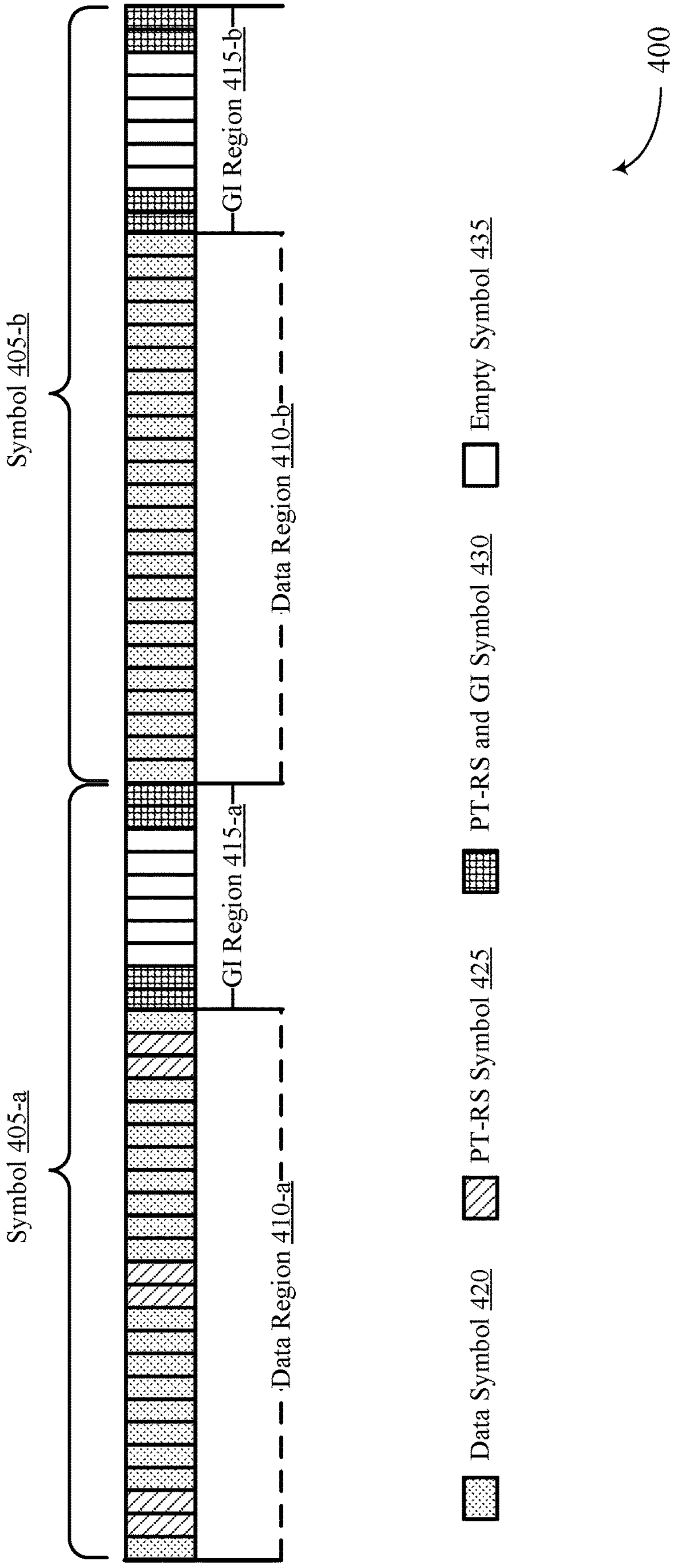
FIG. 4 shows an example of a resource grid that supports PT-RS design for GI-based waveforms in accordance with one or more aspects of the present disclosure.

FIG. 4 shows an example of a resource grid 400 that supports PT-RS design for GI-based waveforms in accordance with one or more aspects of the present disclosure. The resource grid 400 may implement aspects of the wireless communications system 100 and the wireless communications system 200 described with reference to FIGS. 1 and 2, respectively. For example, the resource grid 400 may be based on a configuration by a network entity 105 and implemented by a UE 115. The resource grid 400 may illustrate PT-RS locations within a GI-based single carrier waveform, such as a DFT-s-OFDM waveform.

As described with reference to FIGS. 2 and 3A-3E, a network entity may schedule a UE with one or more PUSCHs to be transmitted using a GI-based single carrier waveform. The UE may generate one or more PT-RSs and may arrange the one or more PT-RSs into one or more groups of resource elements according to an intra-symbol PT-RS pattern for the GI-based single carrier waveform. For example, the UE may use a GI-based single carrier waveform to transmit a scheduled PUSCH that includes a symbol 405-*a* and a symbol 405-*b*. Each of the symbols 405 may include a data region 410 and a GI region 415. The UE may transmit data via data symbols 420 and PT-RS samples via PT-RS symbols 425 within data regions 410 and in accordance with the intra-symbol PT-RS pattern. The UE may transmit a GI within each GI region 415. For example, the UE may generate a ZT GI for each symbol 405, such that each GI region 415 includes one or more empty symbols 435.

In some cases, the UE may be configured to transmit PT-RS according to a periodicity. The periodicity may be such that the UE does not transmit PT-RS in every symbol 405. For example, the UE may be configured (e.g., by the network entity) to transmit PT-RS in every other symbol 405, such that the symbol 405-*a* includes PT-RS but the symbol 405-*b* does not include PT-RS. In such cases, to maintain circular convolution properties, the UE may transmit PT-RS samples in every GI region 415 of a symbol 405 (e.g., even in symbols 405 without PT-RSs), such that contents of a GI region 415 are consistent across symbols 405. The intra-symbol PT-RS pattern may indicate resource elements, such as PT-RS and GI symbols 430, within the GI regions 415 that are allocated for PT-RS samples.

More specifically, the intra-symbol PT-RS pattern may indicate PT-RS symbols 425 within a data region 410-*a* of the symbol 405-*a*, as well as PT-RS and GI symbols 430 within a GI region 415-*a* of the symbol 405-*a* and PT-RS and GI symbols within a GI region 415-*b* of the symbol 405-*b*. Thus, a data region 410-*b* of the symbol 405-*b* may only include data symbols 420 and may not include PT-RS symbols 430.

Figure 5:
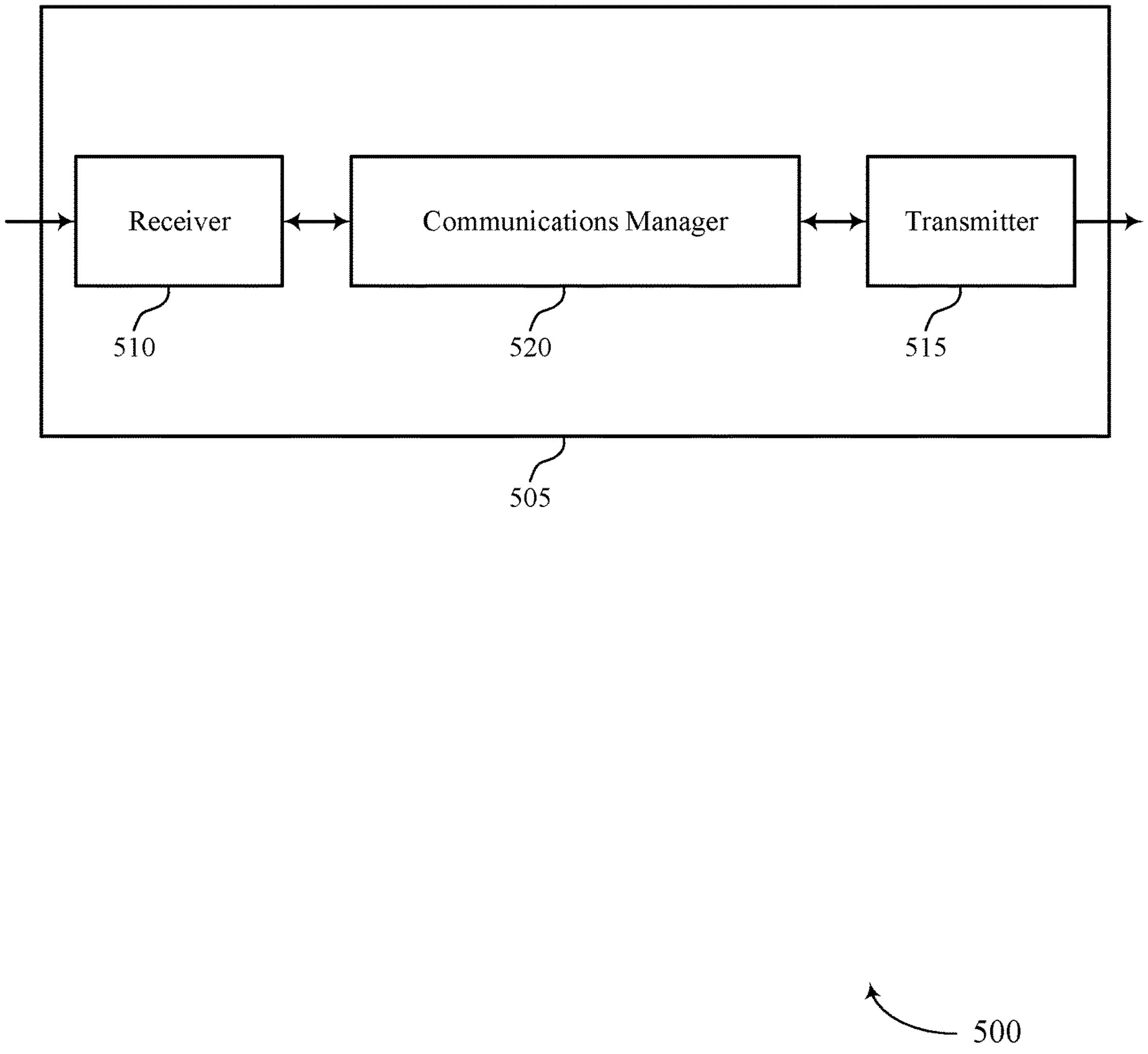
FIGS. 5 and 6 show block diagrams of devices that support PT-RS design for GI-based waveforms in accordance with one or more aspects of the present disclosure.

FIG. 5 shows a block diagram 500 of a device 505 that supports PT-RS design for GI-based waveforms in accordance with one or more aspects of the present disclosure. The device 505 may be an example of aspects of a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to PT-RS design for GI-based waveforms). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to PT-RS design for GI-based waveforms). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of PT-RS design for GI-based waveforms as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving a message indicating an intra-symbol PT-RS pattern for a GI-based single carrier waveform. The communications manager 520 is capable of, configured to, or operable to support a means for generating a set of multiple PT-RSs in accordance with the intra-symbol PT-RS pattern and a GI region of the GI-based single carrier waveform. The communications manager 520 is capable of, configured to, or operable to support a means for transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for transmitting PT-RS using GI-based single carrier waveforms, which may provide more efficient utilization of communication resources and, in turn, reduce processing and power consumption at the device 505.

Figure 6:
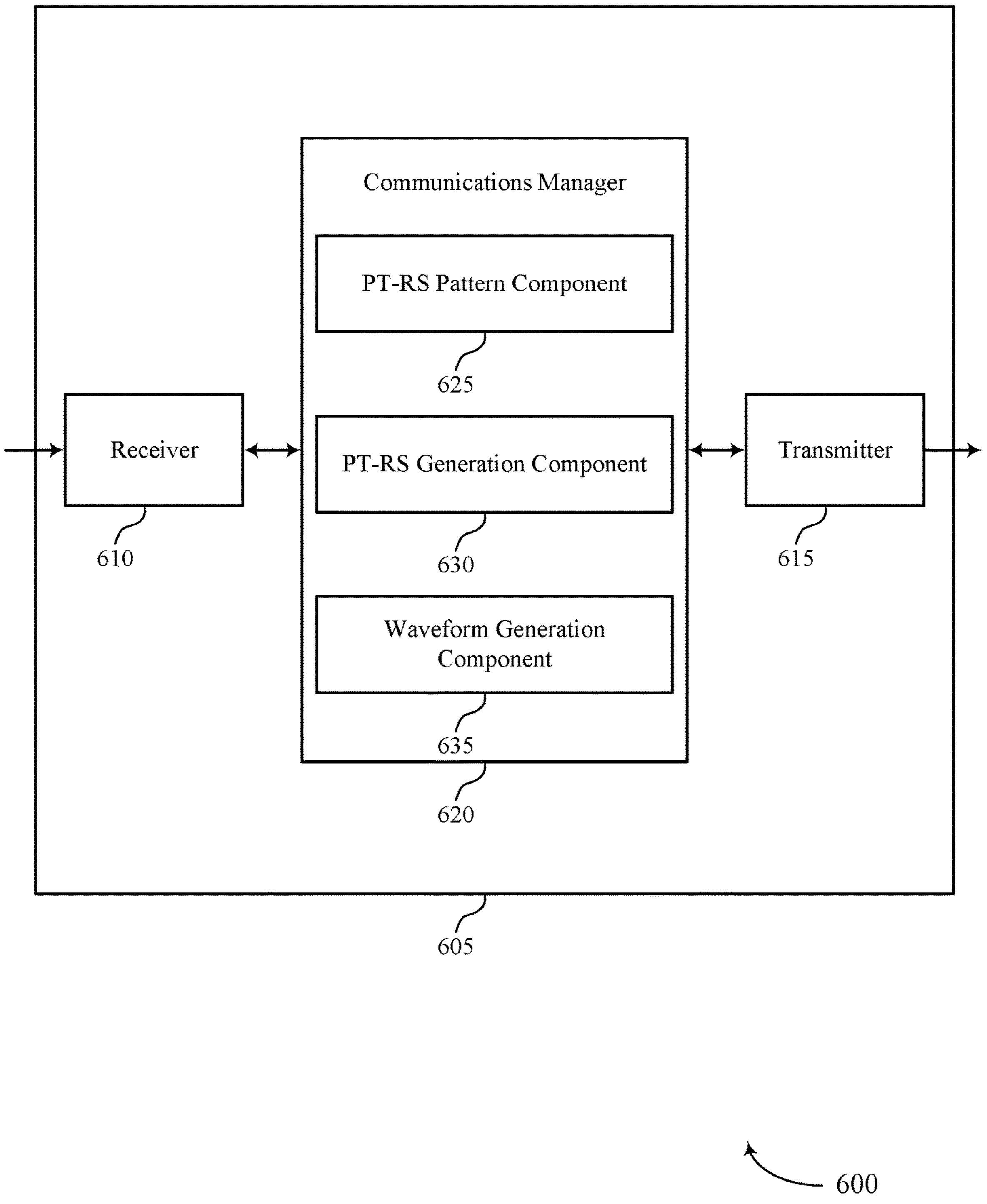

FIG. 6 shows a block diagram 600 of a device 605 that supports PT-RS design for GI-based waveforms in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to PT-RS design for GI-based waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to PT-RS design for GI-based waveforms). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of PT-RS design for GI-based waveforms as described herein. For example, the communications manager 620 may include a PT-RS pattern component 625, a PT-RS generation component 630, a waveform generation component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The PT-RS pattern component 625 is capable of, configured to, or operable to support a means for receiving a message indicating an intra-symbol PT-RS pattern for a GI-based single carrier waveform. The PT-RS generation component 630 is capable of, configured to, or operable to support a means for generating a set of multiple PT-RSs in accordance with the intra-symbol PT-RS pattern and a GI region of the GI-based single carrier waveform. The waveform generation component 635 is capable of, configured to, or operable to support a means for transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

Figure 7:
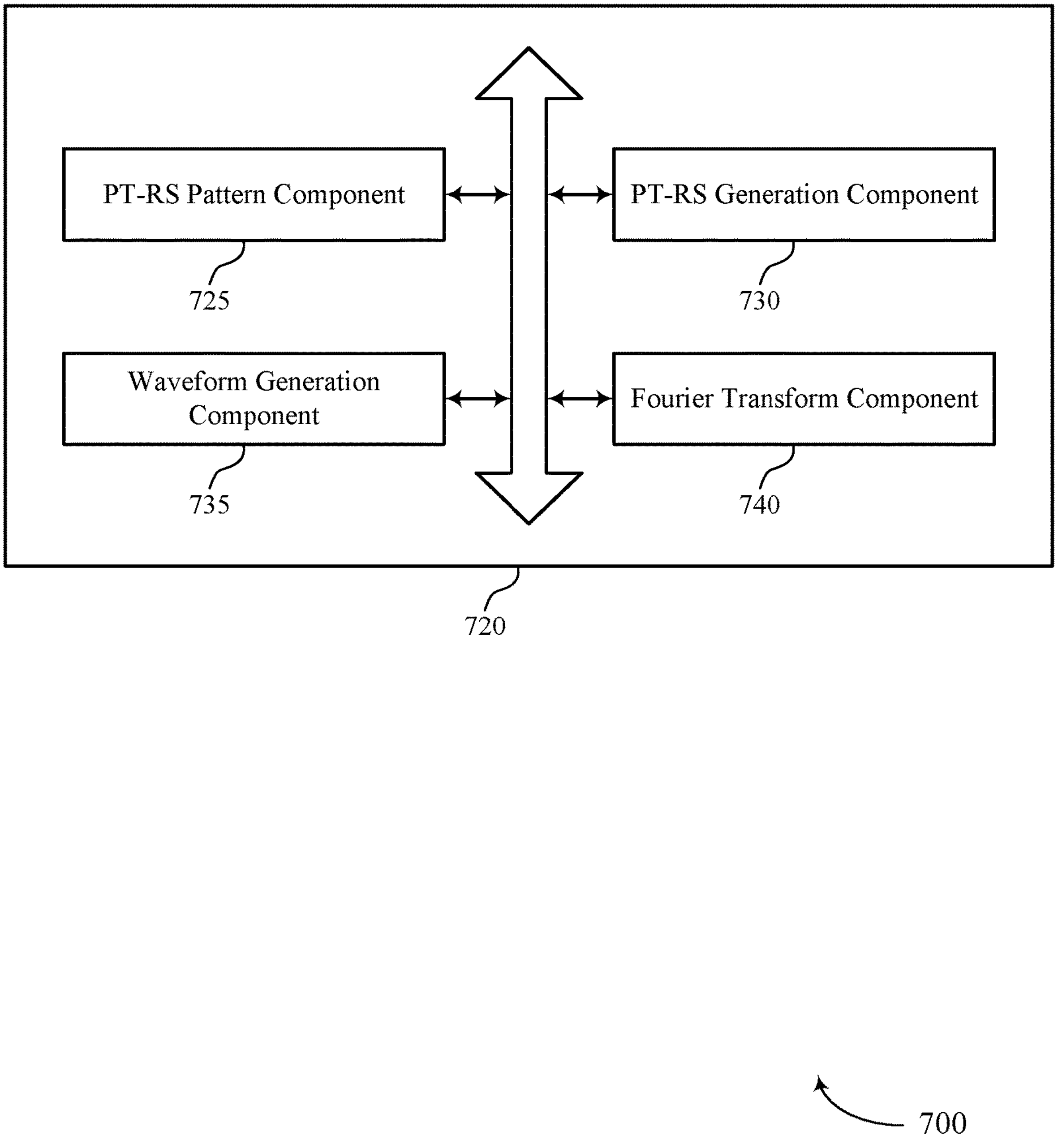
FIG. 7 shows a block diagram of a communications manager that supports PT-RS design for GI-based waveforms in accordance with one or more aspects of the present disclosure.

FIG. 7 shows a block diagram 700 of a communications manager 720 that supports PT-RS design for GI-based waveforms in accordance with one or more aspects of the present disclosure. The communications manager 720 may be an example of aspects of a communications manager 520, a communications manager 620, or both, as described herein. The communications manager 720, or various components thereof, may be an example of means for performing various aspects of PT-RS design for GI-based waveforms as described herein. For example, the communications manager 720 may include a PT-RS pattern component 725, a PT-RS generation component 730, a waveform generation component 735, a Fourier transform component 740, or any combination thereof. Each of these components may communicate, directly or indirectly, with one another (e.g., via one or more buses).

The communications manager 720 may support wireless communications at a UE in accordance with examples as disclosed herein. The PT-RS pattern component 725 is capable of, configured to, or operable to support a means for receiving a message indicating an intra-symbol PT-RS pattern for a GI-based single carrier waveform. The PT-RS generation component 730 is capable of, configured to, or operable to support a means for generating a set of multiple PT-RSs in accordance with the intra-symbol PT-RS pattern and a GI region of the GI-based single carrier waveform. The waveform generation component 735 is capable of, configured to, or operable to support a means for transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

In some examples, to support transmitting the set of multiple PT-RSs, the PT-RS pattern component 725 is capable of, configured to, or operable to support a means for arranging the set of multiple PT-RSs into one or more groups of resource elements of the GI-based single carrier waveform in accordance with the intra-symbol PT-RS pattern.

In some examples, to support receiving the message, the PT-RS pattern component 725 is capable of, configured to, or operable to support a means for receiving, via the message, an indication of a numerical quantity of the one or more groups of resource elements and a numerical quantity of resource elements per group of resource elements for the intra-symbol PT-RS pattern. In some examples, at least one of the one or more groups of resource elements span the GI region of the GI-based single carrier waveform in accordance with the intra-symbol PT-RS pattern. In some examples, at least one of the one or more groups of resource elements spans a boundary between the data region of the GI-based single carrier waveform and the GI region of the GI-based single carrier waveform in accordance with the intra-symbol PT-RS pattern.

In some examples, the one or more groups of resource elements are located within the GI region of the GI-based single carrier waveform in accordance with the intra-symbol PT-RS pattern. In some examples, the one or more groups of resource elements are located within the data region of the GI-based single carrier waveform in accordance with the intra-symbol PT-RS pattern.

In some examples, to support transmitting the set of multiple PT-RSs, the PT-RS pattern component 725 is capable of, configured to, or operable to support a means for arranging the set of multiple PT-RSs into a first one or more groups of resource elements within the data region of the GI-based single carrier waveform and a second one or more groups of resource elements within the GI region of the GI-based single carrier waveform in accordance with the intra-symbol PT-RS pattern.

In some examples, the set of multiple PT-RSs are transmitted via a first symbol of the GI-based single carrier waveform, and the waveform generation component 735 is capable of, configured to, or operable to support a means for transmitting, via a second symbol of the GI-based single carrier waveform, a subset of PT-RSs of the set of multiple PT-RSs within a second GI region of the GI-based single carrier waveform.

In some examples, the intra-symbol PT-RS pattern is based on a quantity of resource elements of the GI region of the GI-based single carrier waveform, a quantity of resource blocks of the GI-based single carrier waveform, or a combination thereof.

In some examples, the Fourier transform component 740 is capable of, configured to, or operable to support a means for performing a DFT on the GI-based single carrier waveform that includes the set of multiple the PT-RSs in accordance with the intra-symbol PT-RS pattern. In some examples, the Fourier transform component 740 is capable of, configured to, or operable to support a means for performing an IFFT on the GI-based single carrier waveform, where the set of multiple PT-RSs are included in the data region, the GI region, or both in accordance with the pattern.

In some examples, the GI region includes a ZT/ZH GI subsequent to the data region of the GI-based single carrier waveform. In some examples, the GI region is subsequent in a time domain to the data region of the GI-based single carrier waveform.

Figure 8:
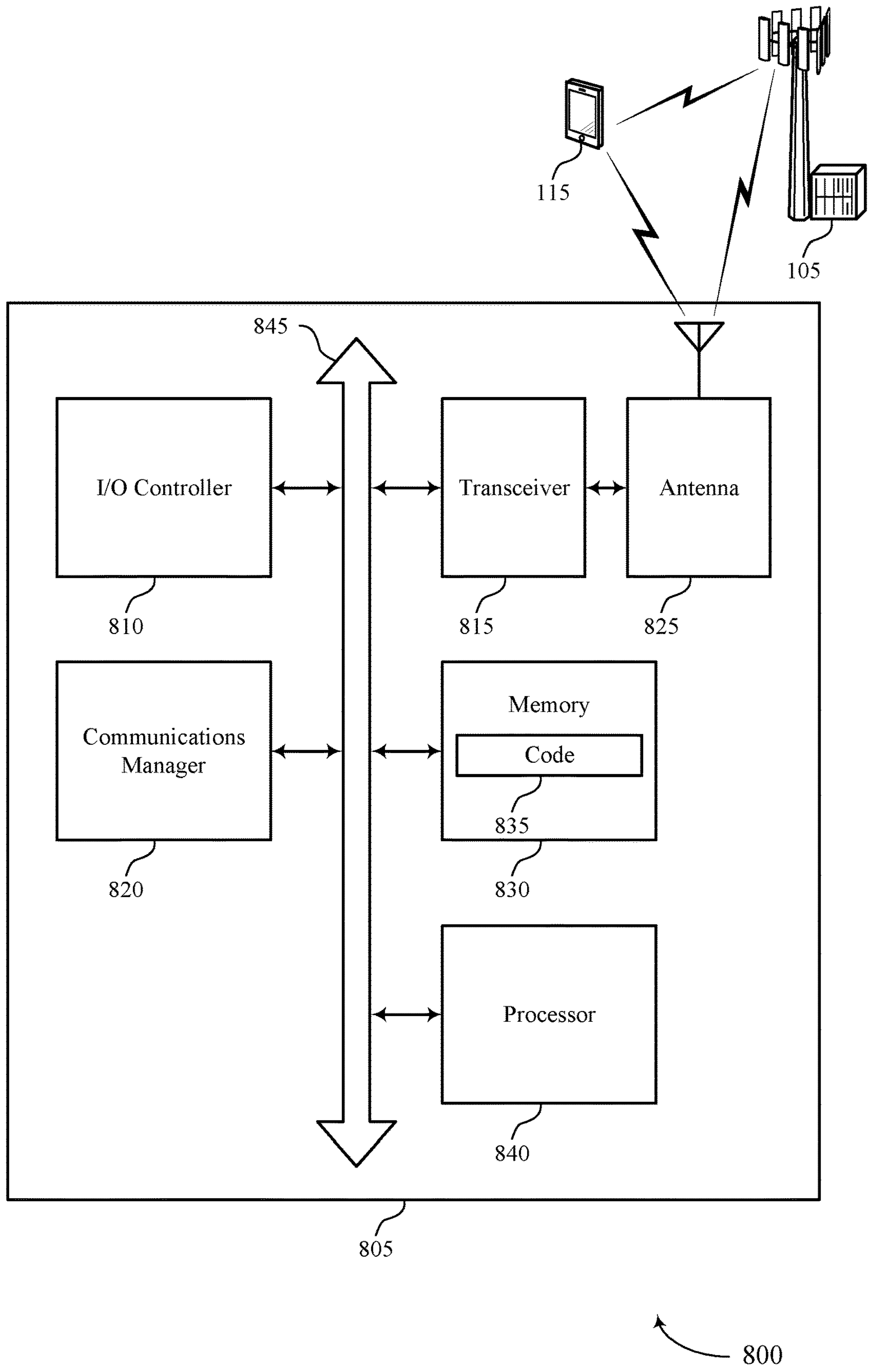
FIG. 8 shows a diagram of a system including a device that supports PT-RS design for GI-based waveforms in accordance with one or more aspects of the present disclosure.

FIG. 8 shows a diagram of a system 800 including a device 805 that supports PT-RS design for GI-based waveforms in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting PT-RS design for GI-based waveforms). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving a message indicating an intra-symbol PT-RS pattern for a GI-based single carrier waveform. The communications manager 820 is capable of, configured to, or operable to support a means for generating a set of multiple PT-RSs in accordance with the intra-symbol PT-RS pattern and a GI region of the GI-based single carrier waveform. The communications manager 820 is capable of, configured to, or operable to support a means for transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern.

By including or configuring the communications manager 820 in accordance with examples as described herein, the device 805 may support techniques for transmitting PT-RS using GI-based single carrier waveforms, which may provide more efficient utilization of communication resources. Further, by enabling PT-RS in GI-based single carrier waveforms, phase noise error correction performance may be improved, thereby increasing communications reliability and reducing communications latency at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of PT-RS design for GI-based waveforms as described herein, or the processor 840 and the memory 830 may be otherwise configured to perform or support such operations.

Figure 9:
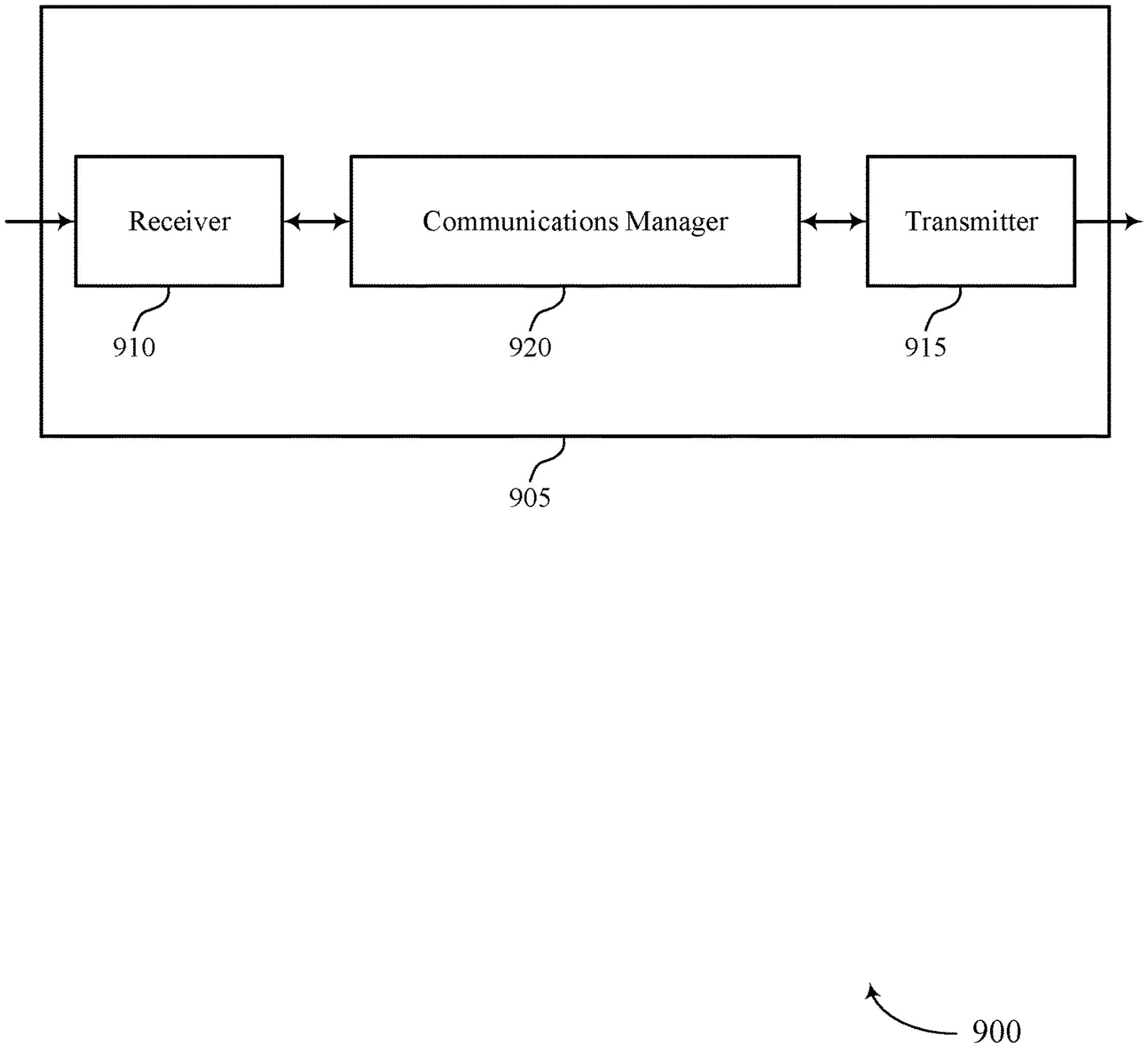
FIGS. 9 and 10 show block diagrams of devices that support PT-RS design for GI-based waveforms in accordance with one or more aspects of the present disclosure.

FIG. 9 shows a block diagram 900 of a device 905 that supports PT-RS design for GI-based waveforms in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of PT-RS design for GI-based waveforms as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting a message indicating an intra-symbol PT-RS pattern for a GI-based single carrier waveform. The communications manager 920 is capable of, configured to, or operable to support a means for receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for receiving PT-RS using GI-based single carrier waveforms, which may provide more efficient utilization of communication resources and, in turn, reduce processing and power consumption at the device 905.

Figure 10:
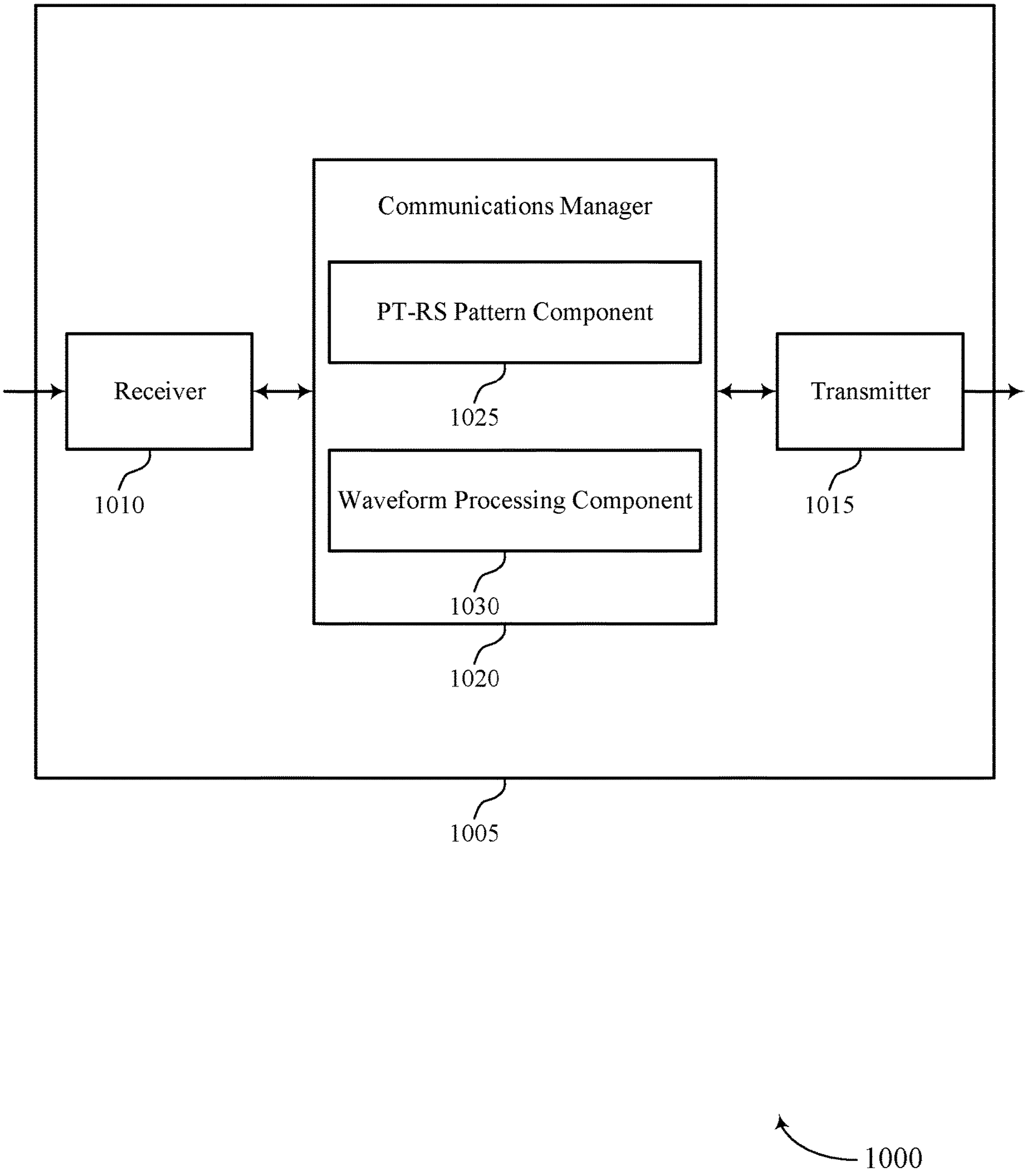

FIG. 10 shows a block diagram 1000 of a device 1005 that supports PT-RS design for GI-based waveforms in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of PT-RS design for GI-based waveforms as described herein. For example, the communications manager 1020 may include a PT-RS pattern component 1025 a waveform processing component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The PT-RS pattern component 1025 is capable of, configured to, or operable to support a means for transmitting a message indicating an intra-symbol PT-RS pattern for a GI-based single carrier waveform. The waveform processing component 1030 is capable of, configured to, or operable to support a means for receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

Figure 11:
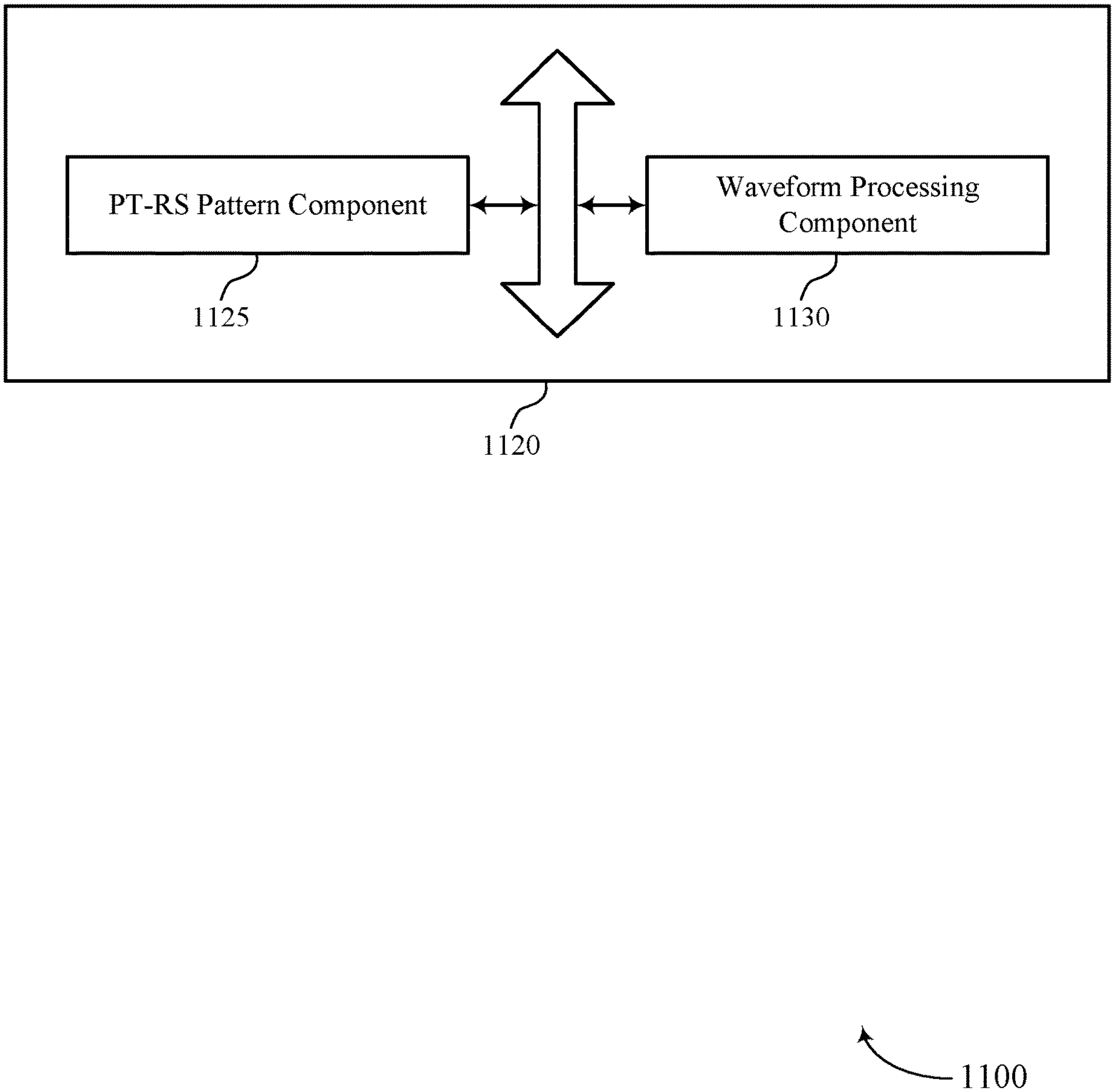
FIG. 11 shows a block diagram of a communications manager that supports PT-RS design for GI-based waveforms in accordance with one or more aspects of the present disclosure.

FIG. 11 shows a block diagram 1100 of a communications manager 1120 that supports PT-RS design for GI-based waveforms in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of PT-RS design for GI-based waveforms as described herein. For example, the communications manager 1120 may include a PT-RS pattern component 1125 a waveform processing component 1130, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The PT-RS pattern component 1125 is capable of, configured to, or operable to support a means for transmitting a message indicating an intra-symbol PT-RS pattern for a GI-based single carrier waveform. The waveform processing component 1130 is capable of, configured to, or operable to support a means for receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

In some examples, to support receiving the set of multiple PT-RSs, the waveform processing component 1130 is capable of, configured to, or operable to support a means for receiving the set of multiple PT-RSs via one or more groups of resource elements of the GI-based single carrier waveform in accordance with the intra-symbol PT-RS pattern.

In some examples, the PT-RS pattern component 1125 is capable of, configured to, or operable to support a means for selecting the intra-symbol PT-RS pattern based on a quantity of resource elements of the GI region of the GI-based single carrier waveform, a quantity of resource blocks of the GI-based single carrier waveform, or a combination thereof.

In some examples, to support transmitting the message, the PT-RS pattern component 1125 is capable of, configured to, or operable to support a means for transmitting, via the message, an indication of a numerical quantity of the one or more groups of resource elements and a numerical quantity of resource elements per group of resource elements for the intra-symbol PT-RS pattern. In some examples, at least one of the one or more groups of resource elements span the GI region of the GI-based single carrier waveform in accordance with the intra-symbol PT-RS pattern. In some examples, at least one of the one or more groups of resource elements spans a boundary between the data region of the GI-based single carrier waveform and the GI region of the GI-based single carrier waveform in accordance with the intra-symbol PT-RS pattern.

In some examples, the one or more groups of resource elements are located within the GI region of the GI-based single carrier waveform in accordance with the intra-symbol PT-RS pattern. In some examples, the one or more groups of resource elements are located within the data region of the GI-based single carrier waveform in accordance with the intra-symbol PT-RS pattern.

In some examples, to support receiving the set of multiple PT-RSs, the waveform processing component 1130 is capable of, configured to, or operable to support a means for receiving the set of multiple PT-RSs via a first one or more groups of resource elements within the data region of the GI-based single carrier waveform and a second one or more groups of resource elements within the GI region of the GI-based single carrier waveform in accordance with the intra-symbol PT-RS pattern.

In some examples, the set of multiple PT-RSs are received via a first symbol of the GI-based single carrier waveform, and the waveform processing component 1130 is capable of, configured to, or operable to support a means for receiving, via a second symbol of the GI-based single carrier waveform, a subset of PT-RSs of the set of multiple PT-RSs within a second GI region of the GI-based single carrier waveform.

In some examples, the GI region includes a ZT/ZH GI subsequent to the data region of the GI-based single carrier waveform. In some examples, the GI region is subsequent in a time domain to the data region of the GI-based single carrier waveform.

Figure 12:
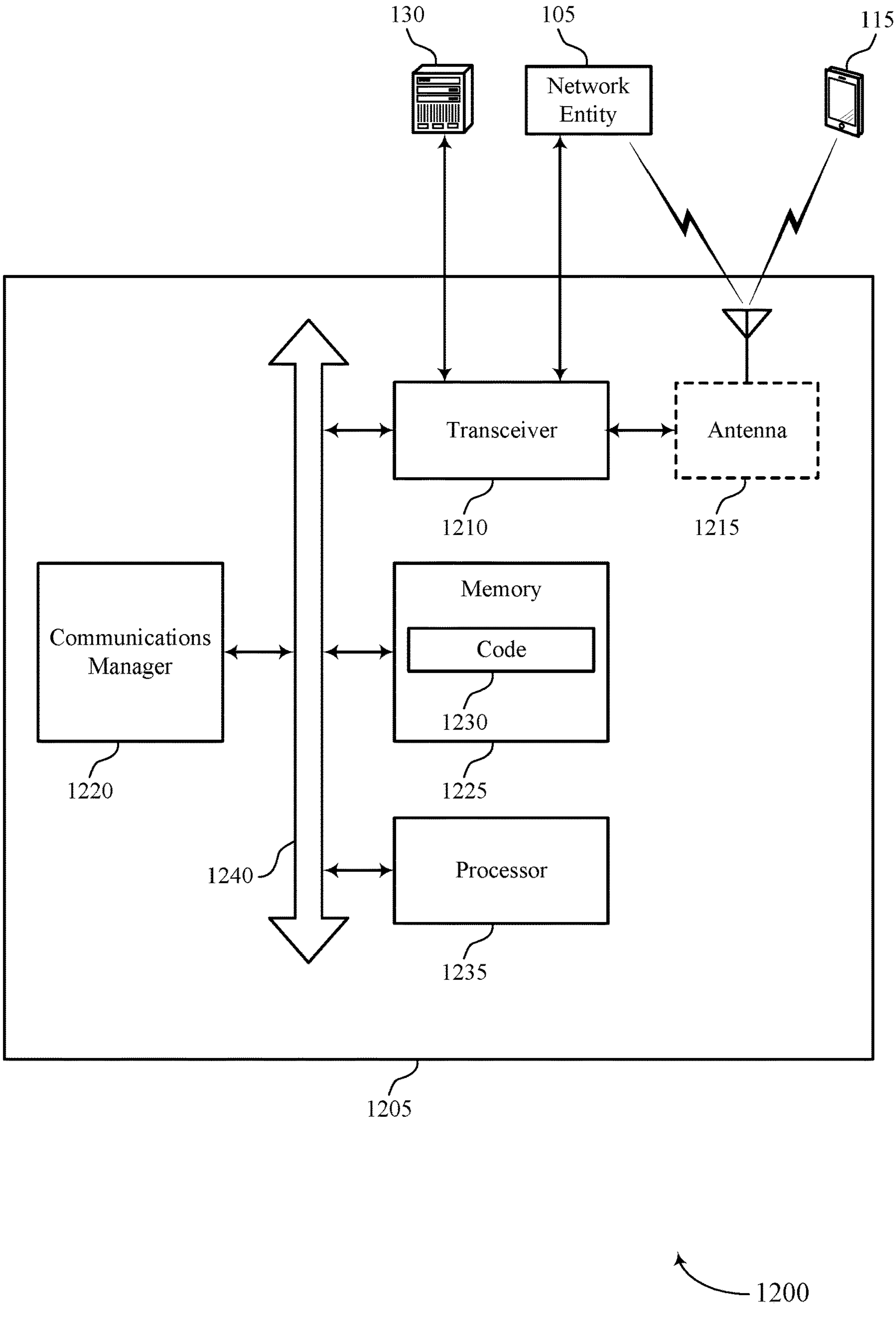
FIG. 12 shows a diagram of a system including a device that supports PT-RS design for GI-based waveforms in accordance with one or more aspects of the present disclosure.

FIG. 12 shows a diagram of a system 1200 including a device 1205 that supports PT-RS design for GI-based waveforms in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting PT-RS design for GI-based waveforms). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting a message indicating an intra-symbol PT-RS pattern for a GI-based single carrier waveform. The communications manager 1220 is capable of, configured to, or operable to support a means for receiving, using the GI-based single carrier waveform, a set of multiple PT-RSs in one or both of a data region of the GI-based single carrier waveform or a GI region of the GI-based single carrier waveform in accordance with the intra-symbol PT-RS pattern.

By including or configuring the communications manager 1220 in accordance with examples as described herein, the device 1205 may support techniques for receiving PT-RS using GI-based single carrier waveforms, which may provide more efficient utilization of communication resources. Further, by enabling PT-RS in GI-based single carrier waveforms, phase noise error correction performance may be improved, thereby increasing communications reliability and reducing communications latency at the device 1205.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of PT-RS design for GI-based waveforms as described herein, or the processor 1235 and the memory 1225 may be otherwise configured to perform or support such operations.

Figure 13:
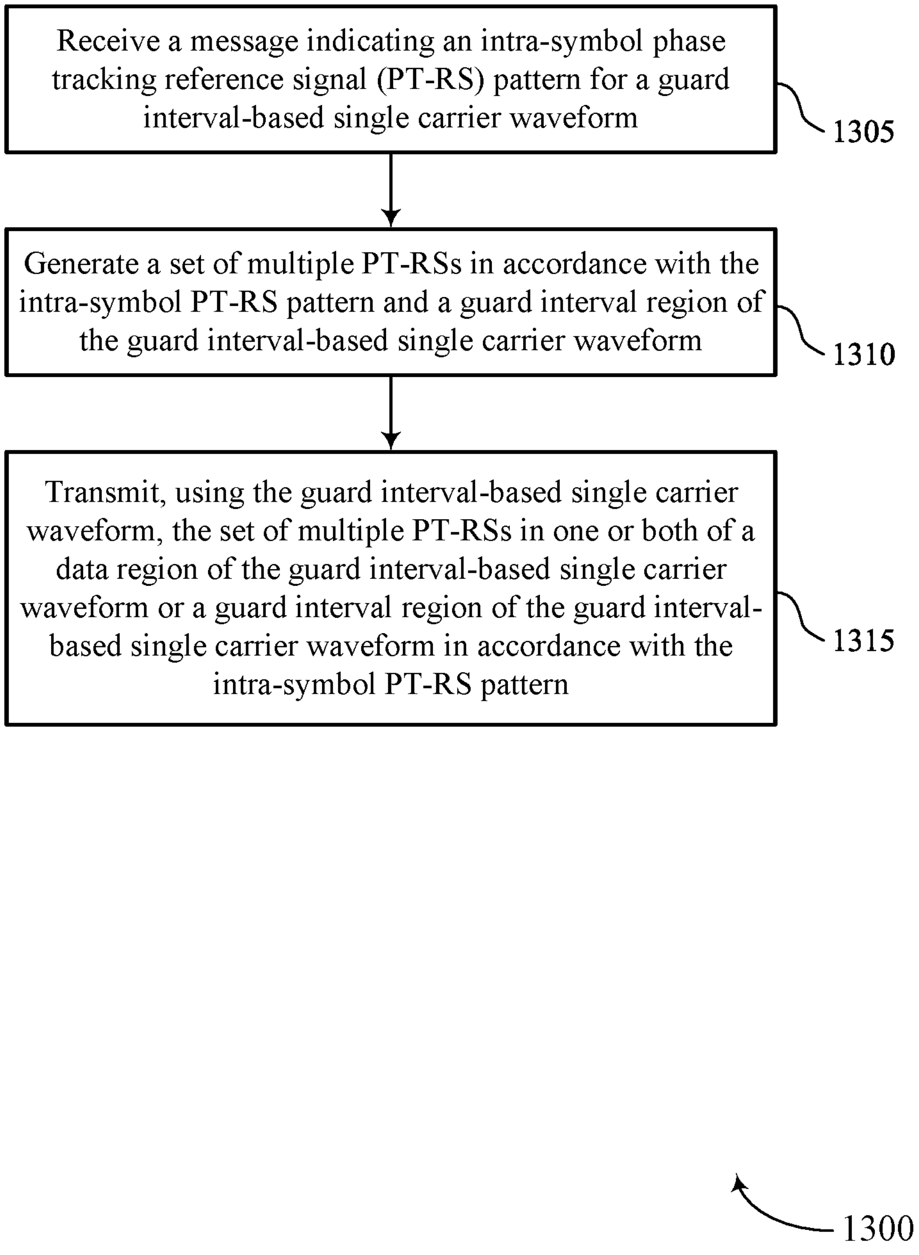
FIGS. 13 through 16 show flowcharts illustrating methods that support PT-RS design for GI-based waveforms in accordance with one or more aspects of the present disclosure.

FIG. 13 shows a flowchart illustrating a method 1300 that supports PT-RS design for GI-based waveforms in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a message indicating an intra-symbol PT-RS pattern for a GI-based single carrier waveform. The operations of block 1305 may be performed in accordance with examples as disclosed herein. In some examples, aspects of the operations of 1305 may be performed by a PT-RS pattern component 725 as described with reference to FIG. 7.

At 1310, the method may include generating a set of multiple PT-RSs in accordance with the intra-symbol PT-RS pattern and a GI region of the GI-based single carrier waveform. The operations of block 1310 may be performed in accordance with examples as disclosed herein. In some examples, aspects of the operations of 1310 may be performed by a PT-RS generation component 730 as described with reference to FIG. 7.

At 1315, the method may include transmitting, using the GI-based single carrier waveform, the set of multiple PT-RSs in one or both of a data region of the GI-based single carrier waveform or a GI region of the GI-based single carrier waveform in accordance with the intra-symbol PT-RS pattern. The operations of block 1315 may be performed in accordance with examples as disclosed herein. In some examples, aspects of the operations of 1315 may be performed by a waveform generation component 735 as described with reference to FIG. 7.

Figure 14:
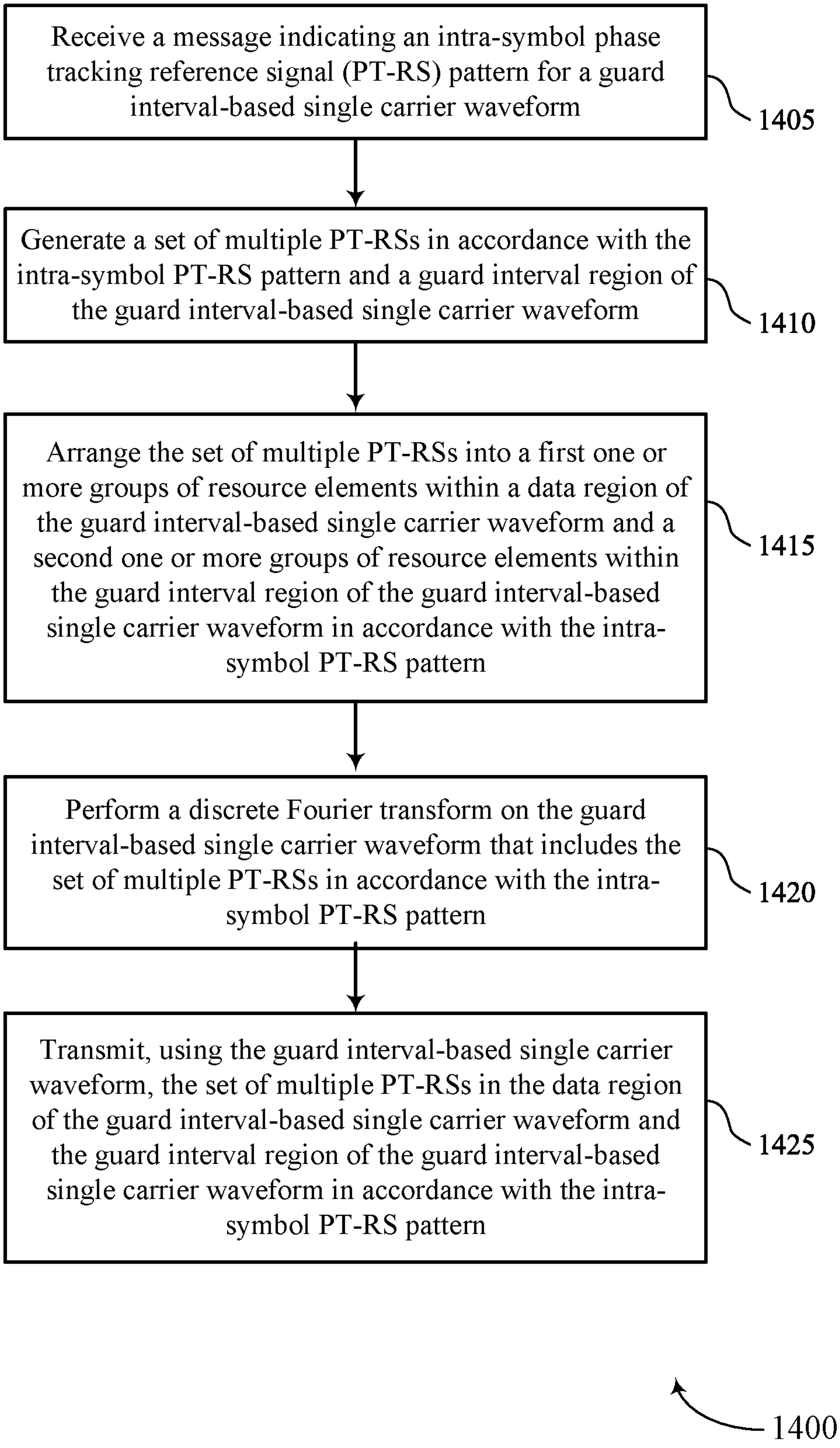

FIG. 14 shows a flowchart illustrating a method 1400 that supports PT-RS design for GI-based waveforms in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a message indicating an intra-symbol PT-RS pattern for a GI-based single carrier waveform. The operations of block 1405 may be performed in accordance with examples as disclosed herein. In some examples, aspects of the operations of 1405 may be performed by a PT-RS pattern component 725 as described with reference to FIG. 7.

At 1410, the method may include generating a set of multiple PT-RSs in accordance with the intra-symbol PT-RS pattern and a GI region of the GI-based single carrier waveform. The operations of block 1410 may be performed in accordance with examples as disclosed herein. In some examples, aspects of the operations of 1410 may be performed by a PT-RS generation component 730 as described with reference to FIG. 7.

At 1415, the method may include arranging the set of multiple PT-RSs into a first one or more groups of resource elements within a data region of the GI-based single carrier waveform and a second one or more groups of resource elements within the GI region of the GI-based single carrier waveform in accordance with the intra-symbol PT-RS pattern. The operations of block 1415 may be performed in accordance with examples as disclosed herein. In some examples, aspects of the operations of 1415 may be performed by a PT-RS pattern component 725 as described with reference to FIG. 7.

At 1420, the method may include performing a DFT on the GI-based single carrier waveform that includes the set of multiple PT-RSs in accordance with the intra-symbol PT-RS pattern. The operations of block 1420 may be performed in accordance with examples as disclosed herein. In some examples, aspects of the operations of 1420 may be performed by a Fourier transform component 740 as described with reference to FIG. 7.

At 1425, the method may include transmitting, using the GI-based single carrier waveform, the set of multiple PT-RSs in the data region of the GI-based single carrier waveform and the GI region of the GI-based single carrier waveform in accordance with the intra-symbol PT-RS pattern. The operations of block 1425 may be performed in accordance with examples as disclosed herein. In some examples, aspects of the operations of 1425 may be performed by a waveform generation component 735 as described with reference to FIG. 7.

Figure 15:
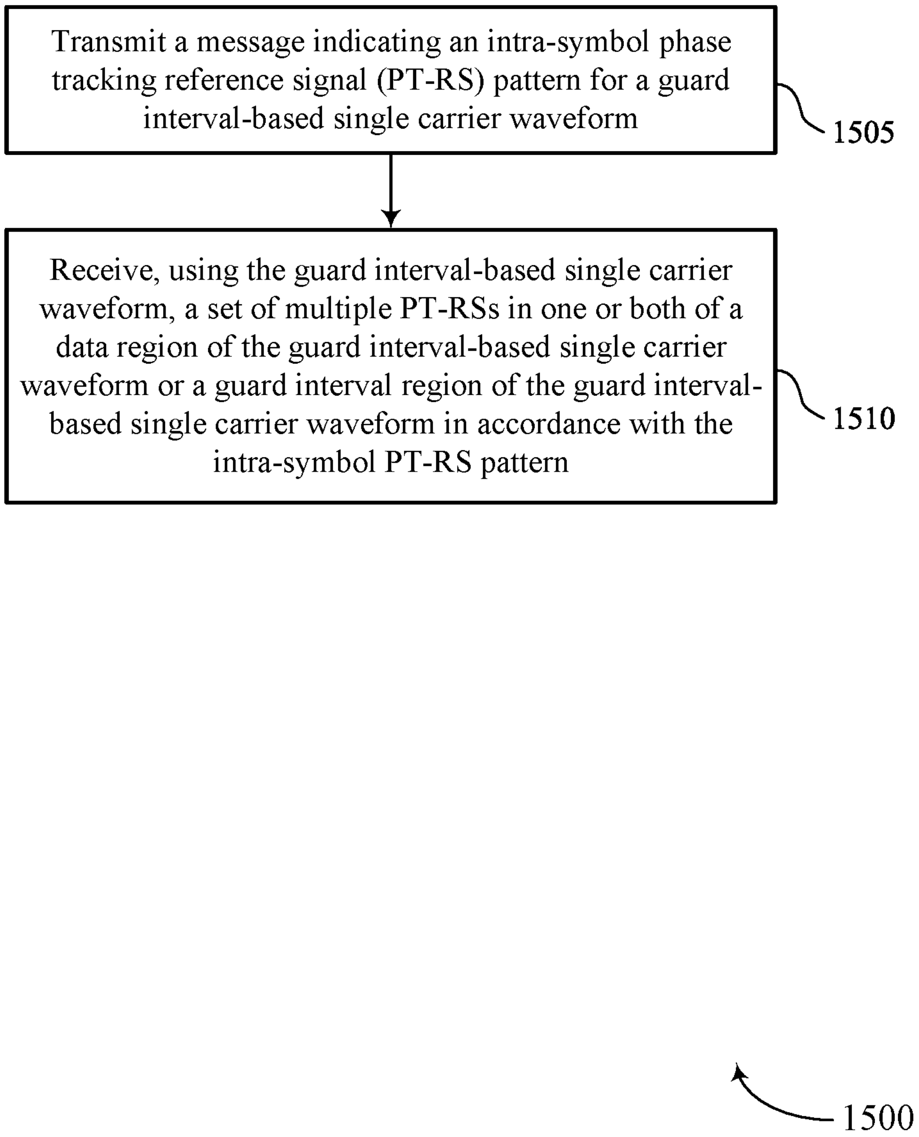

FIG. 15 shows a flowchart illustrating a method 1500 that supports PT-RS design for GI-based waveforms in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a message indicating an intra-symbol PT-RS pattern for a GI-based single carrier waveform. The operations of block 1505 may be performed in accordance with examples as disclosed herein. In some examples, aspects of the operations of 1505 may be performed by a PT-RS pattern component 1125 as described with reference to FIG. 11.

At 1510, the method may include receiving, using the GI-based single carrier waveform, a set of multiple PT-RSs in one or both of a data region of the GI-based single carrier waveform or a GI region of the GI-based single carrier waveform in accordance with the intra-symbol PT-RS pattern. The operations of block 1510 may be performed in accordance with examples as disclosed herein. In some examples, aspects of the operations of 1510 may be performed by a waveform processing component 1130 as described with reference to FIG. 11.

Figure 16:
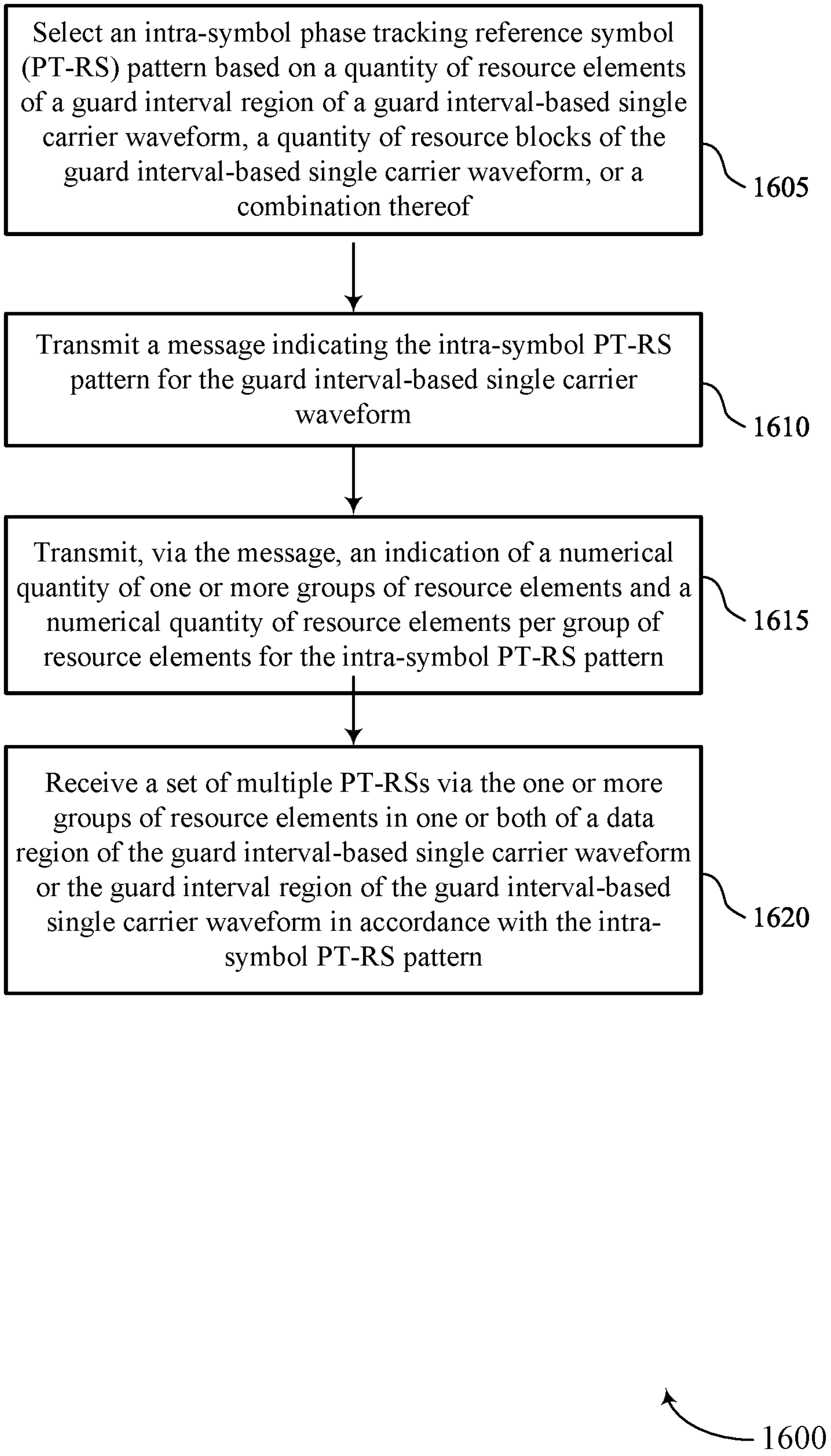

FIG. 16 shows a flowchart illustrating a method 1600 that supports PT-RS design for GI-based waveforms in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include selecting an intra-symbol PT-RS pattern based on a quantity of resource elements of a GI region of a GI-based single carrier waveform, a quantity of resource blocks of the GI-based single carrier waveform, or a combination thereof. The operations of block 1605 may be performed in accordance with examples as disclosed herein. In some examples, aspects of the operations of 1605 may be performed by a PT-RS pattern component 1125 as described with reference to FIG. 11.

At 1610, the method may include transmitting a message indicating the intra-symbol PT-RS pattern for the GI-based single carrier waveform. The operations of block 1610 may be performed in accordance with examples as disclosed herein. In some examples, aspects of the operations of 1610 may be performed by a PT-RS pattern component 1125 as described with reference to FIG. 11.

At 1615, the method may include transmitting, via the message, an indication of a numerical quantity of one or more groups of resource elements and a numerical quantity of resource elements per group of resource elements for the intra-symbol PT-RS pattern. The operations of block 1615 may be performed in accordance with examples as disclosed herein. In some examples, aspects of the operations of 1615 may be performed by a PT-RS pattern component 1125 as described with reference to FIG. 11.

At 1620, the method may include receiving a set of multiple PT-RSs via the one or more groups of resource elements in one or both of a data region of the GI-based single carrier waveform or the GI region of the GI-based single carrier waveform in accordance with the intra-symbol PT-RS pattern. The operations of block 1620 may be performed in accordance with examples as disclosed herein. In some examples, aspects of the operations of 1620 may be performed by a waveform processing component 1130 as described with reference to FIG. 11.

The following provides an overview of aspects of the present disclosure:

Aspect 1: A method for wireless communications at a UE, comprising: receiving a message indicating an intra-symbol PT-RS pattern for a GI-based single carrier waveform; generating a plurality of PT-RSs in accordance with the intra-symbol PT-RS pattern and a GI region of the GI-based single carrier waveform; and transmitting, using the GI-based single carrier waveform, the plurality of PT-RSs in one or both of a data region of the GI-based single carrier waveform or a GI region of the GI-based single carrier waveform in accordance with the intra-symbol PT-RS pattern.

Aspect 2: The method of aspect 1, wherein transmitting the plurality of PT-RSs comprises: arranging the plurality of PT-RSs into one or more groups of resource elements of the GI-based single carrier waveform in accordance with the intra-symbol PT-RS pattern.

Aspect 3: The method of aspect 2, wherein receiving the message comprises: receiving, via the message, an indication of a numerical quantity of the one or more groups of resource elements and a numerical quantity of resource elements per group of resource elements for the intra-symbol PT-RS pattern.

Aspect 4: The method of any of aspects 2 through 3, wherein at least one of the one or more groups of resource elements span the GI region of the GI-based single carrier waveform in accordance with the intra-symbol PT-RS pattern.

Aspect 5: The method of any of aspects 2 through 3, wherein at least one of the one or more groups of resource elements spans a boundary between the data region of the GI-based single carrier waveform and the GI region of the GI-based single carrier waveform in accordance with the intra-symbol PT-RS pattern.

Aspect 6: The method of any of aspects 2 through 3, wherein the one or more groups of resource elements are located within the GI region of the GI-based single carrier waveform in accordance with the intra-symbol PT-RS pattern.

Aspect 7: The method of any of aspects 2 through 3, wherein the one or more groups of resource elements are located within the data region of the GI-based single carrier waveform in accordance with the intra-symbol PT-RS pattern.

Aspect 8: The method of any of aspects 2 through 3, wherein transmitting the plurality of PT-RSs comprises: arranging the plurality of PT-RSs into a first one or more groups of resource elements within the data region of the GI-based single carrier waveform and a second one or more groups of resource elements within the GI region of the GI-based single carrier waveform in accordance with the intra-symbol PT-RS pattern.

Aspect 9: The method of aspect 8, wherein the plurality of PT-RSs are transmitted via a first symbol of the GI-based single carrier waveform, the method further comprising: transmitting, via a second symbol of the GI-based single carrier waveform, a subset of PT-RSs of the plurality of PT-RSs within a second GI region of the GI-based single carrier waveform.

Aspect 10: The method of any of aspects 1 through 9, wherein the intra-symbol PT-RS pattern is based at least in part on a quantity of resource elements of the GI region of the GI-based single carrier waveform, a quantity of resource blocks of the GI-based single carrier waveform, or a combination thereof.

Aspect 11: The method of any of aspects 1 through 10, further comprising: performing a DFT on the GI-based single carrier waveform that includes the plurality of the PT-RSs in accordance with the intra-symbol PT-RS pattern.

Aspect 12: The method of any of aspects 1 through 11, further comprising: performing an IFFT on the GI-based single carrier waveform, wherein the plurality of PT-RSs are included in the data region, the GI region, or both in accordance with the pattern.

Aspect 13: The method of any of aspects 1 through 12, wherein the GI region comprises a ZT/ZH GI subsequent to the data region of the GI-based single carrier waveform.

Aspect 14: The method of any of aspects 1 through 13, wherein the GI region is subsequent in a time domain to the data region of the GI-based single carrier waveform.

Aspect 15: A method for wireless communications at a network entity, comprising: transmitting a message indicating an intra-symbol PT-RS pattern for a GI-based single carrier waveform; and receiving, using the GI-based single carrier waveform, a plurality of PT-RSs in one or both of a data region of the GI-based single carrier waveform or a GI region of the GI-based single carrier waveform in accordance with the intra-symbol PT-RS pattern.

Aspect 16: The method of aspect 15, wherein receiving the plurality of PT-RSs comprises: receiving the plurality of PT-RSs via one or more groups of resource elements of the GI-based single carrier waveform in accordance with the intra-symbol PT-RS pattern.

Aspect 17: The method of aspect 16, further comprising: selecting the intra-symbol PT-RS pattern based at least in part on a quantity of resource elements of the GI region of the GI-based single carrier waveform, a quantity of resource blocks of the GI-based single carrier waveform, or a combination thereof.

Aspect 18: The method of aspect 17, wherein transmitting the message comprises: transmitting, via the message, an indication of a numerical quantity of the one or more groups of resource elements and a numerical quantity of resource elements per group of resource elements for the intra-symbol PT-RS pattern.

Aspect 19: The method of any of aspects 16 through 18, wherein at least one of the one or more groups of resource elements span the GI region of the GI-based single carrier waveform in accordance with the intra-symbol PT-RS pattern.

Aspect 20: The method of any of aspects 16 through 18, wherein at least one of the one or more groups of resource elements spans a boundary between the data region of the GI-based single carrier waveform and the GI region of the GI-based single carrier waveform in accordance with the intra-symbol PT-RS pattern.

Aspect 21: The method of any of aspects 16 through 18, wherein the one or more groups of resource elements are located within the GI region of the GI-based single carrier waveform in accordance with the intra-symbol PT-RS pattern.

Aspect 22: The method of any of aspects 16 through 18, wherein the one or more groups of resource elements are located within the data region of the GI-based single carrier waveform in accordance with the intra-symbol PT-RS pattern.

Aspect 23: The method of any of aspects 16 through 18, wherein receiving the plurality of PT-RSs comprises: receiving the plurality of PT-RSs via a first one or more groups of resource elements within the data region of the GI-based single carrier waveform and a second one or more groups of resource elements within the GI region of the GI-based single carrier waveform in accordance with the intra-symbol PT-RS pattern.

Aspect 24: The method of aspect 23, wherein the plurality of PT-RSs are received via a first symbol of the GI-based single carrier waveform, the method further comprising: receiving, via a second symbol of the GI-based single carrier waveform, a subset of PT-RSs of the plurality of PT-RSs within a second GI region of the GI-based single carrier waveform.

Aspect 25: The method of any of aspects 15 through 24, wherein the GI region comprises a ZT/ZH GI subsequent to the data region of the GI-based single carrier waveform.

Aspect 26: The method of any of aspects 15 through 25, wherein the GI region is subsequent in a time domain to the data region of the GI-based single carrier waveform.

Aspect 27: An apparatus for wireless communications at a UE, comprising at least one processor; one or more memories coupled with the at least one processor; and instructions stored in the one or more memories and executable by the at least one processor to cause the apparatus to perform a method of any of aspects 1 through 14.

Aspect 28: An apparatus for wireless communications at a UE, comprising at least one means for performing a method of any of aspects 1 through 14.

Aspect 29: A non-transitory computer-readable medium storing code for wireless communications at a UE, the code comprising instructions executable by at least one processor to perform a method of any of aspects 1 through 14.

Aspect 30: An apparatus for wireless communications at a network entity, comprising at least one processor; one or more memories coupled with the at least one processor; and instructions stored in the one or more memories and executable by the at least one processor to cause the apparatus to perform a method of any of aspects 15 through 26.

Aspect 31: An apparatus for wireless communications at a network entity, comprising at least one means for performing a method of any of aspects 15 through 26.

Aspect 32: A non-transitory computer-readable medium storing code for wireless communications at a network entity, the code comprising instructions executable by at least one processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor;

one or more memories coupled with the at least one processor; and instructions stored in the one or more memories and executable by the at least one processor to cause the apparatus to:

receive a message indicating an intra-symbol phase tracking reference signal (PT-RS) pattern for a guard interval-based single carrier waveform, wherein the intra-symbol PT-RS pattern is based at least in part on a quantity of resource elements of a guard interval region of the guard interval-based single carrier waveform;

generate a plurality of PT-RSs in accordance with the intra-symbol PT-RS pattern and the guard interval region of the guard interval-based single carrier waveform; and transmit, using the guard interval-based single carrier waveform, the plurality of PT-RSs in at least the guard interval region of the guard interval-based single carrier waveform in accordance with the intra-symbol PT-RS pattern.

2. The apparatus of claim 1, wherein the instructions to transmit the plurality of PT-RSs are executable by the at least one processor to cause the apparatus to:

arrange the plurality of PT-RSs into one or more groups of resource elements of the guard interval-based single carrier waveform in accordance with the intra-symbol PT-RS pattern.

3. The apparatus of claim 2, wherein the instructions to receive the message are executable by the at least one processor to cause the apparatus to:

receive, via the message, an indication of a numerical quantity of the one or more groups of resource elements and a numerical quantity of resource elements per group of resource elements for the intra-symbol PT-RS pattern.

4. The apparatus of claim 2, wherein at least one of the one or more groups of resource elements span the guard interval region of the guard interval-based single carrier waveform in accordance with the intra-symbol PT-RS pattern.

5. The apparatus of claim 2, wherein at least one of the one or more groups of resource elements spans a boundary between a data region of the guard interval-based single carrier waveform and the guard interval region of the guard interval-based single carrier waveform in accordance with the intra-symbol PT-RS pattern.

6. The apparatus of claim 2, wherein the one or more groups of resource elements are located within the guard interval region of the guard interval-based single carrier waveform in accordance with the intra-symbol PT-RS pattern.

7. The apparatus of claim 2, wherein the one or more groups of resource elements are located within a data region of the guard interval-based single carrier waveform in accordance with the intra-symbol PT-RS pattern.

8. The apparatus of claim 2, wherein the instructions to transmit the plurality of PT-RSs are executable by the at least one processor to cause the apparatus to:

arrange the plurality of PT-RSs into a first one or more groups of resource elements within a data region of the guard interval-based single carrier waveform and a second one or more groups of resource elements within the guard interval region of the guard interval-based single carrier waveform in accordance with the intra-symbol PT-RS pattern.

9. The apparatus of claim 8, wherein the plurality of PT-RSs are transmitted via a first symbol of the guard interval-based single carrier waveform, and the instructions are further executable by the at least one processor to cause the apparatus to:

transmit, via a second symbol of the guard interval-based single carrier waveform, a subset of PT-RSs of the plurality of PT-RSs within a second guard interval region of the guard interval-based single carrier waveform.

10. The apparatus of claim 1, wherein the intra-symbol PT-RS pattern is based at least in part on a quantity of resource blocks of the guard interval-based single carrier waveform.

11. The apparatus of claim 1, wherein the instructions are further executable by the at least one processor to cause the apparatus to:

perform a discrete Fourier transform on the guard interval-based single carrier waveform that includes the plurality of PT-RSs in accordance with the intra-symbol PT-RS pattern.

12. The apparatus of claim 1, wherein the instructions are further executable by the at least one processor to cause the apparatus to:

perform an inverse fast Fourier transform on the guard interval-based single carrier waveform, wherein the plurality of PT-RSs are included in a data region of the guard interval-based single carrier waveform, the guard interval region, or both in accordance with the intra-symbol PT-RS pattern.

13. The apparatus of claim 1, wherein the guard interval region comprises a zero-tail zero-head guard interval subsequent to a data region of the guard interval-based single carrier waveform.

14. The apparatus of claim 1, wherein the guard interval region is subsequent in a time domain to a data region of the guard interval-based single carrier waveform.

15. An apparatus for wireless communications at a network entity, comprising:

at least one processor;

one or more memories coupled with the at least one processor; and instructions stored in the one or more memories and executable by the at least one processor to cause the apparatus to:

transmit a message indicating an intra-symbol phase tracking reference signal (PT-RS) pattern for a guard interval-based single carrier waveform, wherein the intra-symbol PT-RS pattern is based at least in part on a quantity of resource elements of a guard interval region of the guard interval-based single carrier waveform; and receive, using the guard interval-based single carrier waveform, a plurality of PT-RSs in at least the guard interval region of the guard interval-based single carrier waveform in accordance with the intra-symbol PT-RS pattern.

16. The apparatus of claim 15, wherein the instructions to receive the plurality of PT-RSs are executable by the at least one processor to cause the apparatus to:

receive the plurality of PT-RSs via one or more groups of resource elements of the guard interval-based single carrier waveform in accordance with the intra-symbol PT-RS pattern.

17. The apparatus of claim 16, wherein the instructions are further executable by the at least one processor to cause the apparatus to:

select the intra-symbol PT-RS pattern based at least in part on a quantity of resource blocks of the guard interval-based single carrier waveform.

18. The apparatus of claim 17, wherein the instructions to transmit the message are executable by the at least one processor to cause the apparatus to:

transmit, via the message, an indication of a numerical quantity of the one or more groups of resource elements and a numerical quantity of resource elements per group of resource elements for the intra-symbol PT-RS pattern.

19. The apparatus of claim 16, wherein at least one of the one or more groups of resource elements span the guard interval region of the guard interval-based single carrier waveform in accordance with the intra-symbol PT-RS pattern.

20. The apparatus of claim 16, wherein at least one of the one or more groups of resource elements spans a boundary between a data region of the guard interval-based single carrier waveform and the guard interval region of the guard interval-based single carrier waveform in accordance with the intra-symbol PT-RS pattern.

21. The apparatus of claim 16, wherein the one or more groups of resource elements are located within the guard interval region of the guard interval-based single carrier waveform in accordance with the intra-symbol PT-RS pattern.

22. The apparatus of claim 16, wherein the one or more groups of resource elements are located within a data region of the guard interval-based single carrier waveform in accordance with the intra-symbol PT-RS pattern.

23. The apparatus of claim 16, wherein the instructions to receive the plurality of PT-RSs are executable by the at least one processor to cause the apparatus to:

receive the plurality of PT-RSs via a first one or more groups of resource elements within a data region of the guard interval-based single carrier waveform and a second one or more groups of resource elements within the guard interval region of the guard interval-based single carrier waveform in accordance with the intra-symbol PT-RS pattern.

24. The apparatus of claim 23, wherein the plurality of PT-RSs are received via a first symbol of the guard interval-based single carrier waveform, and the instructions are further executable by the at least one processor to cause the apparatus to:

receive, via a second symbol of the guard interval-based single carrier waveform, a subset of PT-RSs of the plurality of PT-RSs within a second guard interval region of the guard interval-based single carrier waveform.

25. The apparatus of claim 15, wherein the guard interval region comprises a zero-tail zero-head guard interval subsequent to a data region of the guard interval-based single carrier waveform.

26. The apparatus of claim 15, wherein the guard interval region is subsequent in a time domain to a data region of the guard interval-based single carrier waveform.

27. A method for wireless communications at a user equipment (UE), comprising:

receiving a message indicating an intra-symbol phase tracking reference signal (PT-RS) pattern for a guard interval-based single carrier waveform, wherein the intra-symbol PT-RS pattern is based at least in part on a quantity of resource elements of a guard interval region of the guard interval-based single carrier waveform;

generating a plurality of PT-RSs in accordance with the intra-symbol PT-RS pattern and the guard interval region of the guard interval-based single carrier waveform; and transmitting, using the guard interval-based single carrier waveform, the plurality of PT-RSs in at least the guard interval region of the guard interval-based single carrier waveform in accordance with the intra-symbol PT-RS pattern.

28. The method of claim 27, wherein transmitting the plurality of PT-RSs comprises:

arranging the plurality of PT-RSs into one or more groups of resource elements of the guard interval-based single carrier waveform in accordance with the intra-symbol PT-RS pattern.

29. A method for wireless communications at a network entity, comprising:

transmitting a message indicating an intra-symbol phase tracking reference signal (PT-RS) pattern for a guard interval-based single carrier waveform, wherein the intra-symbol PT-RS pattern is based at least in part on a quantity of resource elements of a guard interval region of the guard interval-based single carrier waveform; and receiving, using the guard interval-based single carrier waveform, a plurality of PT-RSs in at least the guard interval region of the guard interval-based single carrier waveform in accordance with the intra-symbol PT-RS pattern.

30. The method of claim 29, wherein receiving the plurality of PT-RSs comprises:

receiving the plurality of PT-RSs via one or more groups of resource elements of the guard interval-based single carrier waveform in accordance with the intra-symbol PT-RS pattern.

* * * * *